(12) United States Patent
Yang et al.

(10) Patent No.: US 9,321,856 B2
(45) Date of Patent: Apr. 26, 2016

(54) PROCESS TO PRODUCE FUNCTIONALIZED POLYMER

(71) Applicant: ExxonMobil Chemical Patents Inc., Baytown, TX (US)

(72) Inventors: Yong Yang, Kingwood, TX (US); Jay L. Reimers, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/550,397

(22) Filed: Nov. 21, 2014

(65) Prior Publication Data

US 2015/0175754 A1 Jun. 25, 2015

Related U.S. Application Data

(60) Provisional application No. 61/918,334, filed on Dec. 19, 2013.

(51) Int. Cl.
C08J 3/00 (2006.01)
C08F 8/00 (2006.01)

(52) U.S. Cl.
CPC .......................................... *C08F 8/00* (2013.01)

(58) Field of Classification Search
CPC ........ C08J 3/203; C08J 3/005; C08J 2427/24; C08J 2347/00
See application file for complete search history.

(56) References Cited

U.S. PATENT DOCUMENTS

| | | | |
|---|---|---|---|
| 3,285,949 A | 11/1966 | Siebert | |
| 3,290,267 A * | 12/1966 | Vanderbilt et al. | .... C08F 255/00 523/212 |
| 5,115,019 A | 5/1992 | Marx et al. | |
| 5,844,050 A | 12/1998 | Fukahori et al. | |
| 6,022,929 A | 2/2000 | Chen et al. | |
| 6,147,180 A | 11/2000 | Markel et al. | |
| 6,169,154 B1 | 1/2001 | Machida et al. | |
| 6,444,773 B1 | 9/2002 | Markel | |
| 6,451,728 B1 | 9/2002 | Matsui et al. | |
| 6,555,635 B2 | 4/2003 | Markel | |
| 6,660,809 B1 | 12/2003 | Weng et al. | |
| 6,750,307 B2 | 6/2004 | Weng et al. | |
| 6,774,191 B2 | 8/2004 | Weng et al. | |
| 6,784,256 B1 | 8/2004 | Lee et al. | |
| 7,795,347 B2 | 9/2010 | Kaneko et al. | |
| 8,623,974 B2 | 1/2014 | Jiang et al. | |
| 2009/0318644 A1 | 12/2009 | Brant et al. | |
| 2012/0245310 A1 | 9/2012 | Crowther et al. | |
| 2012/0245312 A1 | 9/2012 | Holtcamp et al. | |
| 2014/0364536 A1 | 12/2014 | Kawai | |

FOREIGN PATENT DOCUMENTS

| | | |
|---|---|---|
| EP | 0 958 309 | 11/1999 |
| JP | A-2001-72706 | 3/2001 |
| JP | A-2002-332312 | 11/2002 |
| JP | A-2003-313247 | 11/2003 |
| JP | A-2004-107486 | 4/2004 |
| JP | A-2004-107563 | 4/2004 |
| WO | WO 00/32645 | 6/2000 |
| WO | WO 2013/118496 | 8/2013 |

OTHER PUBLICATIONS

U.S. Appl. No. 61/918,334, filed Dec. 19, 2013, Yang et al.
Boaen et al., "Selective and Mild Oxyfunctionalization of Model Polyolefins", Macromolecules, vol. 36, Issue 19, Aug. 29, 2003, pp. 7027-7034.
Cainelli et al., "Cleavage of Olefins by Polymer-Supported Osmium Tetroxide and Sodium Periodate", Synthesis, 1, Jan. 1989, pp. 47-48.
Guizard et al., "Investigation of the Oxidative Cleavage of Butyl Rubber by Selective Catalysis", European Polymer Journal, Pergamo Press Ltd., Oxford, GB, vol. 15, No. 7, Jan. 1, 1979, pp. 689-693.
Hatefi et al. "Ru(salophen)Cl Supported on Polystyrene-Bound Imidazole: An Efficient and Robust Heterogeneous Catalyst for Epoxidation of Alkenes with Sodium Periodate", Applied Catalysis A: General, vol. 370, Issue 1-2, Nov. 30, 2009, pp. 66-71.
Kirschning et al., "Functionalized Polymers-Emerging Versatile Tools for Solution-Phase Chemistry and Automated Parallel Synthetics", Angewandte Chemie International Edition, 2001, vol. 40, Issue 4, pp. 650-679.
Reyx et al., "Controlled Degradation in Tailor-Made Macromolecules Elaboration. Controlled Chain-Cleavages of Polydienes by Oxidation and By Metathesis", Angewandte Makromolekulare Chemie, Applied Macromolecularchemistry and Physics, Wiley VCH. Weinheim, DE, vol. 247, No. 1, Jun. 21, 1996, pp. 197-211 (XP002595175).
Sakada et al., "Controlled Chemical Degradation of Natural Rubber Using Periodic Acid: Application for Recycling Waste Tyre Rubber", Polymer Degradation and Stability, Barking, GB, vol. 97, No. 5, Jan. 17, 2012, pp. 816-828 (XP028478990).
Thottumkara et al., "Oxidative Cleavage of Alkenes Using an In Situ Generated Iodonium Ion with Oxone as a Terminal Oxidant", Organic Letters (2010), 12, pp. 5640-5643.

\* cited by examiner

*Primary Examiner* — Nathan M Nutter

(57) ABSTRACT

This invention relates to a process to produce a functionalized polymer comprising:
  a) contacting an iodine modified aromatic polymer with an oxidizing agent to obtain an iodonium salt of the aromatic polymer;
  b) contacting the iodonium salt of the aromatic polymer with a polymer having internal or terminal unsaturation(s); and
  c) obtaining a functionalized polymer from the polymer having internal or terminal unsaturation(s) wherein the functionalized polymer has an $M_n$ less than the $M_n$ of the polymer having internal or terminal unsaturation(s) and the functionalized polymer has an acid number higher than the acid number of the polymer having internal or terminal unsaturation(s).

33 Claims, 7 Drawing Sheets

GPC-3D of Hydrogenated PBd from Example 1

GPC-3D of Hydrogenated PBd from Example 1

PROCESS TO PRODUCE FUNCTIONALIZED POLYMER

CROSS REFERENCE TO RELATED APPLICATIONS

This application claims the benefit of and priority to U.S. Ser. No. 61/918,334, filed Dec. 19, 2013, the disclosure of which is incorporated herein by reference in its entirety.

FIELD OF THE INVENTION

This invention relates to processes to produce functionalized polymers using iodine modified polymer and uses of such functionalized polymers.

BACKGROUND OF THE INVENTION

Hydrocarbon polymers and oligomers with polar end groups, especially telechelic polymers and oligomers, are very important and useful building blocks for many chemical syntheses and processes. However the many applications of these polymers and oligomers are hindered by the limited availability of such functional polymers and oligomers. Currently most of the commercially available telechelic hydrocarbon polymers are based on polybutadienes, which are produced by a radical process to generate hydroxyl groups at both the chain ends. Further chemical reactions can convert the hydroxyl groups to some other functional groups such as carboxylic acids, amines and isocyanates. However these processes have poor controllability and tunability. As a result, very limited properties, such as molecular weight, comonomer content, thermal and rheological properties, can be provided. Thus, there is a demand for more versatile processes to generate a wide variety of telechelic polymers and oligomers for many applications.

Currently, no method is available for selective oxidative cleavage of hydrocarbon polymers or cyclic molecules with internal alkenes to generate telechelic hydrocarbon polymers or oligomers with controlled properties such as molecular weight and/or crystallinity.

An example of oxidative cleavage of alkenes is "*Oxidative Cleavage of Alkenes Using an In Situ Generated Iodonium Ion with Oxone as a Terminal Oxidant*", Prem P. Thottumkara and Thottumkara K. Vinod; Organic Letters 2010, 12, pp. 5640-5643.

An example of epoxidation of alkenes (such as dodecene) with sodium periodate is found at Applied Catalysis A: General 370 (2009) pp. 66-71.

Other references of interest include: WO 00/32645 and Macromolecules 2003, 36, 7027-7034; Synthesis (1989) (1) pp. 47-48.

SUMMARY OF THE INVENTION

In one aspect, a process to produce a functionalized polymer is described. The process comprises:
a) contacting an iodine modified aromatic polymer with an oxidizing agent to obtain an iodonium salt of the aromatic polymer;
b) contacting the iodonium salt of the aromatic polymer with a polymer having internal or terminal unsaturations; and
c) obtaining a functionalized polymer from the polymer having internal or terminal unsaturations wherein the functionalized polymer has an $M_n$ less than (preferably at least 10% less than, preferably at least 25% less than, preferably at least 50% less than) the $M_n$ of the polymer having internal or terminal unsaturations and the functionalized polymer has an acid number higher than the acid number of the polymer having internal or terminal unsaturations, preferably at least 20% higher, preferably at least 50% higher, preferably at least 100% higher.

In another aspect, a process to produce a functionalized polymer is also described. The process comprises:
1) contacting a first polymer having internal or terminal unsaturation(s), said first polymer having an $M_n$ of at least 50 g/mol, more particularly at least 500 g/mol, and even more particularly at least 1000 g/mol as determined by GPC, with a complexing agent and an oxidizing agent to obtain a second polymer having internal or terminal functionality and an $M_n$ of the same of 90% or less than the first polymer; and
2) contacting the second polymer with an oxidizing agent comprising an iodine containing compound and an optional phase transfer catalyst to obtain a cleaved functionalized polymer having an $M_n$ less than that of the $M_n$ of the first polymer.

The polymer having internal or terminal unsaturation can be a polyolefin. Suitable polyolefins include polydienes or a vinyl/vinylidene terminated macromonomer (VTM).

In yet another aspect, a process to produce a functionalized polymer is described. The process comprises contacting a first polymer comprising a vinyl or vinylidene terminated macromonomer (VTM), having an $M_n$ of at least 50 g/mol, more particularly at least 500 g/mol, and even more particularly at least 1000 g/mol as determined by GPC with an oxidizing agent comprising an iodine containing compound and an optional phase transfer catalyst to obtain the functionalized polymer. The functionalized polymer from the starting polyolefin has an $M_n$ less than the $M_n$ of the starting polyolefin and the functionalized polymer has an acid number higher than the acid number of the original polyolefin.

DETAILED DESCRIPTION

Figure 1:
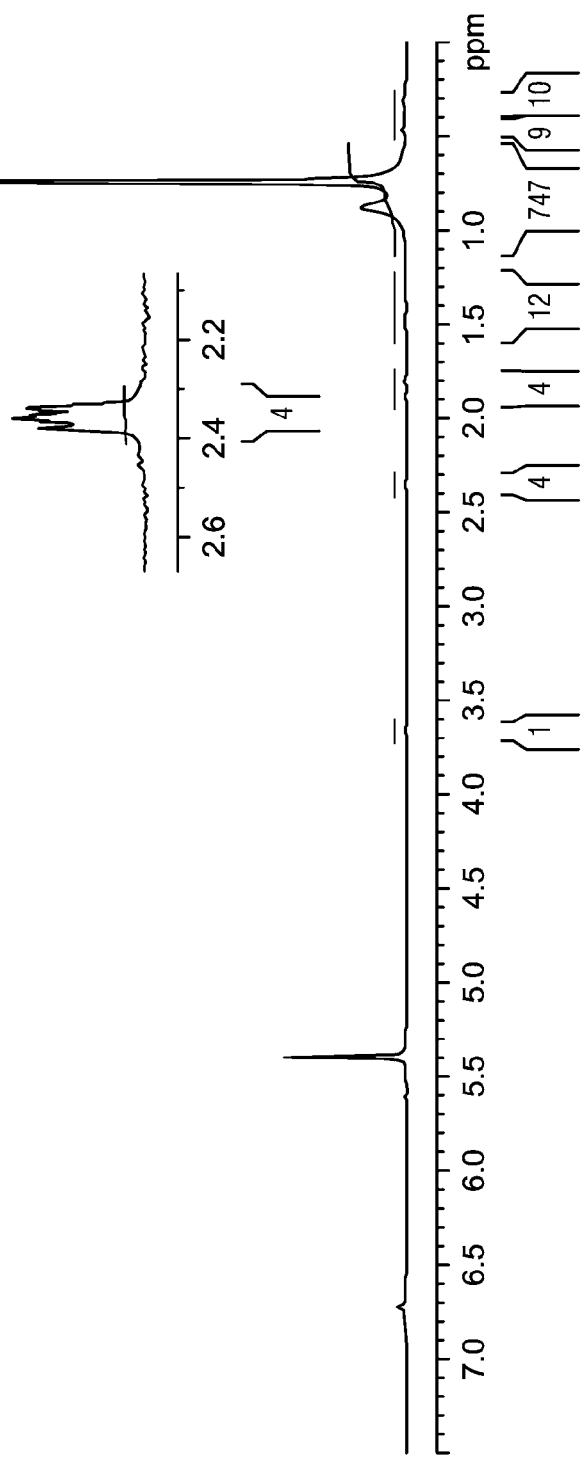
FIG. 1 is a $^1H$ NMR spectrum of hydrogenated and cleaved polymer from Example 1.
Figure 2A:
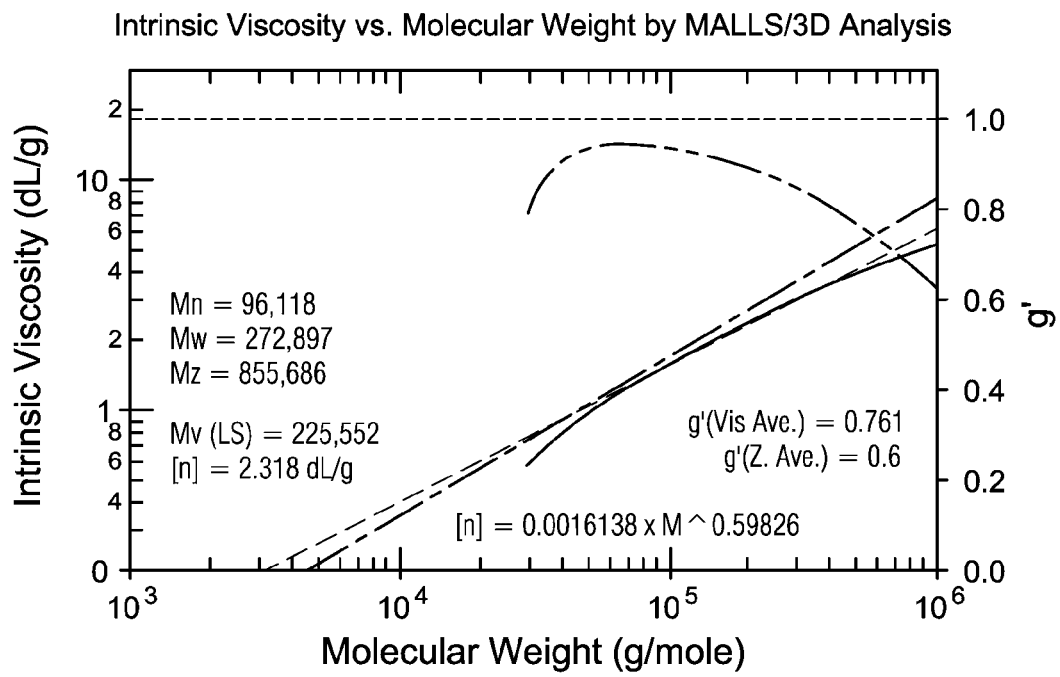
FIG. 2A is a plot of intrinsic viscosity versus molecular weight from the GPC-3D of hydrogenated PBd from Example 1.
Figure 2B:
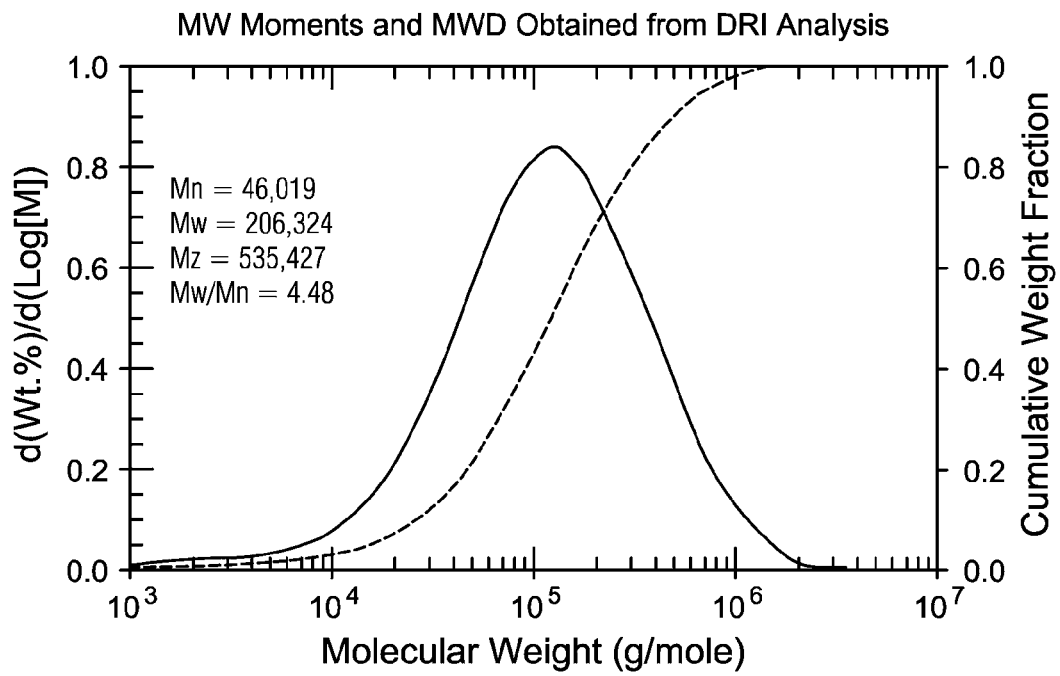
FIG. 2B is a plot of d(Wt. %)/d(Log [M]) versus molecular weight from the GPC-3D of hydrogenated PBd from Example 1.
Figure 2C:
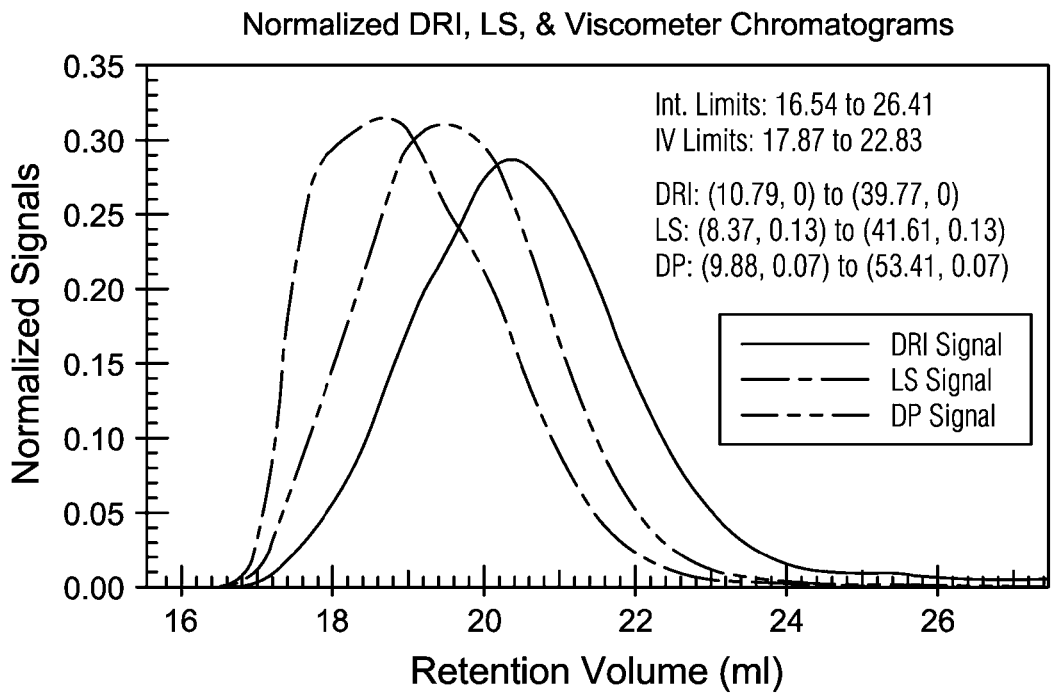
FIG. 2C is a plot of the normalized signals versus the retention volume from the GPC-3D of hydrogenated PBd from Example 1.
Figure 3:
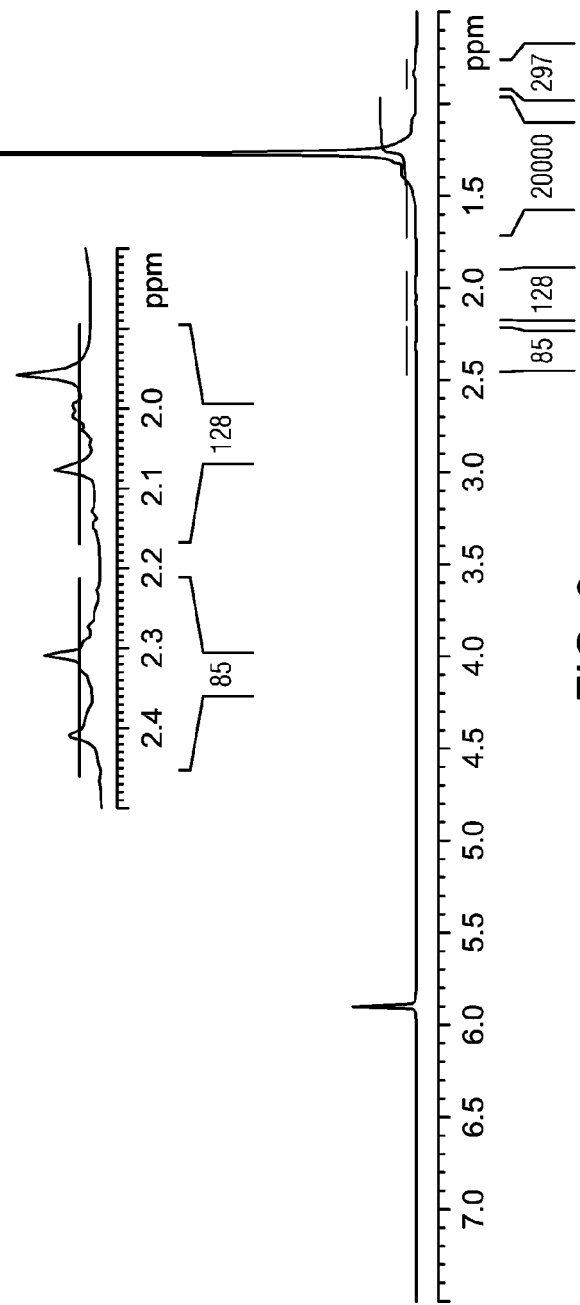
FIG. 3 is a $^1H$ NMR spectrum of hydrogenated and cleaved polymer from Example 2.

For the purposes of this invention and the claims thereto, the new numbering scheme for the Periodic Table Groups is used as described in CHEMICAL AND ENGINEERING NEWS, 63(5), p. 27 (1985). Therefore, a "Group 4 metal" is an element from Group 4 of the Periodic Table, e.g. Hf, Ti, or Zr.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is typically a polymer having a low molecular weight (such an $M_n$ of less than 25,000 g/mol, preferably less than 2,500 g/mol) or a low number of mer units (such as 75 mer units or less, preferably 25 mer units or less). An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For the purposes of this invention, ethylene shall be considered an α-olefin.

As used herein, $M_n$ is number average molecular weight, $M_w$ is weight average molecular weight, and $M_z$ is z average molecular weight, wt % is weight percent, and mol % is mole percent. Molecular weight distribution (MWD), also referred to as polydispersity, is defined to be $M_w$ divided by $M_n$. Unless otherwise noted, all molecular weight units (e.g., $M_w$, $M_n$, $M_z$) are g/mol.

For purposes of this invention and the claims thereto, an ethylene polymer having a density of 0.86 g/cm$^3$ or less is referred to as an ethylene elastomer or elastomer; an ethylene polymer having a density of more than 0.86 to less than 0.910 g/cm$^3$ is referred to as an ethylene plastomer or plastomer; an ethylene polymer having a density of 0.910 to 0.940 g/cm$^3$ is referred to as a low density polyethylene; and an ethylene polymer having a density of more than 0.940 g/cm$^3$ is referred to as a high density polyethylene (HDPE). For these definitions, density is measured by density-gradient column, as described in ASTM D1505, on a compression-molded specimen that has been slowly cooled to room temperature (i.e., over a period of 10 minutes or more) and allowed to age for a sufficient time that the density is constant within +/−0.001 g/cm$^3$. The units for density are g/cm$^3$.

Polyethylene in an overlapping density range, i.e., 0.890 to 0.930 g/cm$^3$, typically from 0.915 to 0.930 g/cm$^3$, which is linear and does not contain long chain branching, is referred to as "linear low density polyethylene" (LLDPE) and can be produced with conventional Ziegler-Natta catalysts, vanadium catalysts, or with metallocene catalysts in gas phase reactors and/or in slurry reactors and/or with metallocene catalysts in solution reactors. "mLLDPE" is an LLDPE made by a metallocene catalyst.

"Linear" means that the polyethylene has no long chain branches; typically referred to as a $g'_{vis}$ of 0.95 or above, preferably 0.97 or above, preferably 0.98 or above, preferably 0.99 or above, preferably 1.0.

Composition Distribution Breadth Index (CDBI) is a measure of the composition distribution of monomer within the polymer chains and is measured by the procedure described in PCT publication WO 93/03093, published Feb. 18, 1993, specifically columns 7 and 8, as well as in Wild et al, J. Poly. Sci., Poly. Phys. Ed., Vol. 20, p. 441 (1982) and U.S. Pat. No. 5,008,204, including that fractions having a weight average molecular weight ($M_w$) below 15,000 g/mol are ignored when determining CDBI.

The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl and Bn is benzyl.

Unless otherwise indicated, room temperature is 23° C.

This invention discloses the production of hydrocarbon polymers or oligomers with polar end groups from their hydrocarbon precursors that contain alkenes, preferably internal alkenes or terminal alkenes, by selective oxidative cleavage. The hydrocarbon precursors with alkenes can be linear polymers such as polybutadienes or polyisobutylene. The alkenes in the hydrocarbon precursors can also be generated by thermal or peroxide degradation of polyolefin (such as polyethylene)-based olefin homo- or co-polymers. In a preferred embodiment, the polyolefin is an ethylene copolymer comprising ethylene and one or more of propylene, butene, pentene, hexane, octene, nonene, decene, undecene, dodecene and/or other alpha-olefins or diolefins. A benefit of using controlled degraded olefin copolymers as starting materials is that it delivers fully saturated functional polyolefins, avoiding the extra hydrogenation step if polybutadienes are used as the starting materials.

Depending on the nature of the precursor and amount of oxidant used, the product can have polar functional group at one chain end, or more preferably polar functional groups at both chain ends, giving rise to a telechelic hydrocarbon polymer. The polar functional groups can be, but are not limited to, carboxylic acid, carboxylate, aldehyde, ketone and alcohol, depending on the oxidant species and dosage. The molecular weight of the product, for some cases such as using polybutadienes as the starting materials, can also be determined by the stoichiometric amount of oxidant used. Hydrocarbon polymers with polar end groups, especially telechelic polymers, are useful building blocks for further chemical syntheses and processes. However these applications are hindered by the limited availability of such functional polymers. For a specific application, a certain defined parameters of the functional polymers, such as molecular weight and crystallinity, are sometimes required. The method described in this invention has the advantage of conveniently producing such functional polymers as needed. The molecular weight and other properties of the product can be controlled during the oxidative cleavage process, mainly by the catalysis, oxidant species and feeding ratio. The method in this invention uniquely and conveniently gives access to many functional polymers, especially telechelic polymers, which are not available by current processes. A potential application of the telechelic polymers is to build up dendritic structures by reacting the telechelic polymers with multifunctional connecting molecules. The chemical reaction and terminal application set up the requirements for the telechelic polymers.

In another embodiment, this invention relates to the production of hydrocarbon polymers with polar end groups from their hydrocarbon precursors that have an $M_n$ of at least 50 g/mol, more particularly at least 500 g/mol, and even more particularly at least 1000 g/mol as determined by GPC and contain terminal alkenes (such as allyl chain ends, specifically vinyl groups) and by contacting the polymer having the terminal alkene with oxidizing agent comprising an iodine containing compound and optional phase transfer catalyst and obtaining functionalized polymer, and optionally hydrogenating the functionalized polymer.

In a preferred embodiment of the invention, this invention relates to a process to produce a functionalized polymer comprising:

1) contacting a first polymer having internal or terminal unsaturation(s), said first polymer having an $M_n$ of at least 50 g/mol, more particularly at least 500 g/mol, and even more particularly at least 1000 g/mol as determined by GPC (as determined by GPC as described below), with a complexing agent and an oxidizing agent to obtain a second polymer having internal or terminal functionality and an $M_n$ of the same or 95% or less than the first polymer; and 2) contacting the second polymer with oxidizing agent comprising an iodine containing compound and optional phase transfer catalyst and obtaining functionalized polymer, and optionally hydrogenating the functionalized polymer.

In another preferred embodiment of the invention, this invention relates to a process to produce a functionalized polymer comprising:

1) contacting iodine modified polymer (preferably an aromatic polymer) with an oxidizing agent to obtain an iodonium salt;

2) contacting the iodonium salt with a polymer having internal or terminal unsaturation(s); and 3) obtaining a functionalized polymer where the functionalized polymer has an $M_n$ less than the $M_n$ of the starting polymer (preferably at least 10% less than, preferably at least 25% less than, preferably at least 50% less than) and the functionalized polymer has an acid number higher than the acid number of the starting polymer, preferably at least 20% higher, preferably at least 50% higher, preferably at least 100% higher.

Iodine Modified Aromatic Polymers

The iodine modified aromatic polymers preferably comprise an iodophenyl group on the crosslinked or non-crosslinked polymers, preferably aromatic polymers. The iodine modified polymers typically contain approximately 0.001 wt % to 10 wt % of iodo groups to the weight % of the polymer, more preferably in the range of 0.01 wt % to 5 wt %, most preferably in the range of 0.05 wt % to 2 wt %. The iodine modified polymers are typically utilized in oxidation/functionalization reactions described herein over temperature range of −100° C. to 300° C., preferably in the range of −50° C. to 200° C., more preferably in the range of 0° C. to 100° C.

Complexing Agent

Complexing agents include a metal or organometallic complex that is able to bind to an alkene. Examples of the complexing agents are $RuCl_3$, $OsO_4$, $PhCOOAg$, $AgOAc$, $Pd(OAc)_2$, $Pd(dba)_3$, $CeCl_3$, $PtCl_2$, etc. The complexing agent is typically impregnated or bound to a solid support in the range of 0.0001 wt % to 10 wt % to the weight % of the solid support, preferably in the range of 0.001 wt % to 5 wt % and more preferably in the range of 0.01 wt % to 2 wt %. The complexing agent, supported or unsupported, is typically used in oxidation/functionalization reactions over the temperature range of −100° C. to 300° C., preferably in the range of −50° C. to 200° C., more preferably in the range of 0° C. to 100° C.

Suitable solid support materials include, for example, inorganic oxides, silica, silicates, carbon, and polymeric materials such as polystyrenes, polyvinylchlorides, polyacrylates or polymethacrylates.

Oxidizing Agents

In one embodiment of the invention, the oxidizing agent is a peroxide, particularly an organic peroxide, wherein at least a methyl group or higher alkyl or aryl is bound to one or both oxygen atoms of the peroxide. In another embodiment of the invention, the oxidizing agent is a sterically hindered peroxide, wherein the alkyl or aryl group associated with each oxygen atom is at least a secondary carbon, a tertiary carbon in another embodiment. Non-limiting examples of useful sterically hindered peroxides include 2,5-bis(tert-butylperoxy)-2,5-dimethylhexane, 2,5-dimethyl-2,5-bis-(t-butylperoxy)-hexyne-3,4-methyl-4-t-butylperoxy-2-pentanone, 3,6,6,9,9-pentamethyl-3-(ethylacetate)-1,2,4,5-textraoxy cyclononane, α,α'-bis-(tert-butylperoxy)diisopropyl benzene, and mixtures of these and any other secondary- or tertiary-hindered peroxides. A preferred peroxide is 2,5-bis(tert-butylperoxy)-2,5-dimethyl-hexane, also known with the commercial name: Luperox™ 101 or Trigonox™ 101. Another common peroxide used as an oxidizing agent is di-t-amyl peroxide, most commonly known with the commercial name DTAP. Still other peroxidizing agents include peroxymonosulfates, such as potassium peroxymonosulfate known as OXONE™ The molar ratio of the oxidizing agents to the to-be-cleaved alkene will preferably be in the range from about 0.1 to about 10, more preferably from about 0.2 to about 8, and most preferably from about 0.3 to about 0.5 to 5.

Oxidizing Agent Containing Iodine

In a preferred embodiment of the invention, the oxidizing agent contains hypervalent iodine. Suitable examples include $NaIO_4$, Dess-Martin Periodinane, Hydroxy(tosyloxy)iodobenzene, Iodosobenzene diacetate, Iodosobenzene bis(trifluoroacetate), Iodosylbenzene, 2-Iodoxybenzoic acid, or Iodobenzene dichloride.

Iodobenzene Dichloride

The molar ratio of the oxidizing agent containing iodine to the to-be-cleaved alkene will preferably be in the range from about 0.1 to about 10, more preferably from about 0.2 to about 8, and most preferably from about 0.5 to about 5.

Iodonium Salt

Iodonium salts are a class of molecules with the general structure of $R_2I^+X^-$, where R is alkyl-, aryl-, alkynyl-, alkenyl-, or fluoroalkyl groups, and $X^-$ is counter anion such as a halide, $BF_4^-$, $PF_6^-$, $AsF_6^-$, $OTs^-$, OTf and salts thereof. Preferably, each R is, independently, an alkyl, aryl, alkynyl, alkenyl, or fluoroalkenyl group, such as methyl, ethyl, propyl, butyl, phenyl, butenyl, propenyl and fluoropropenyl.

Hydrogenation Agents

Hydrogenation can be carried out in the process of the present disclosure by any known hydrogenation catalysis system, including heterogeneous systems and soluble systems. Soluble systems are disclosed in U.S. Pat. No. 4,284,835 at column 1, line 65 through column 9, line 16 as well as U.S. Pat. No. 4,980,331 at column 3, line 40 through column 6, line 28.

For purposes of the present disclosure, "substantially saturated" as it refers to the polymer produced herein means that polymer includes on average fewer than 10 double bonds, or fewer than 5 double bonds, or fewer than 3 double bonds, or fewer than 1 double bond per 100 carbons in a hydrocarbon polymer chain. In a preferred embodiment of the invention, any polymer produced herein is substantially saturated.

Additional teachings to hydrogenation are disclosed in Rachapudy et al., Journal of Polymer Science: Polymer Physics Edition, Vol. 17, pp. 1211-1222 (1979), which is incorporated herein by reference in its entirety. Table 1 of the article discloses several systems including palladium on various supports (calcium carbonate, but also barium sulfide) useful herein. The Rachapudy et al. article discloses preparation of homogeneous catalysts and heterogeneous catalysts useful herein.

The Rachapudy et al. article discloses a method of preparation of a homogeneous catalyst as well. The catalyst can be formed by reaction between a metal alkyl and the organic salt of a transition metal. The metal alkyls were n-butyl lithium (in cyclohexane) and triethyl aluminum (in hexane). The metal salts were cobalt and nickel 2-ethyl hexanoates (in hydrocarbon solvents) and platinum and palladium acetyl-acetonates (solids). Hydrogenation was conducted in a 1-liter heavy-wall glass reactor, fitted with a stainless steel flange top and magnetically stirred. A solution of 5 grams of polybutadiene in 500 milliliters of dry cyclohexane was added, and the reactor was closed and purged with nitrogen. The catalyst complex was prepared separately by adding the transition metal salt to the metal alkyl in cyclohexane under nitrogen. The molar ratio of component metals (alkyl to salt) was generally 3.5/1, the optimum in terms of rate and completeness of hydrogenation. The reactor was heated to 70° C., purged with hydrogen, and the catalyst mixture (usually 0.03 moles of transition metal per mole of double bonds) injected through a rubber septum. Hydrogen pressure was increased to 20 psi (gauge) and the reaction allowed to proceed for approximately 4 hours. Hydrogenation proceeds satisfactorily in the initial stages even at room temperature, but the partially hydrogenated polymer soon begins to crystallize. At 70° C., the polymer remains in solution throughout the reaction.

After hydrogenation the catalyst was decomposed with dilute HCl. The polymer was precipitated with methanol, washed with dilute acid, re-dissolved, re-precipitated, and dried under vacuum. Blank experiments with polyethylene confirmed that the washing procedure was sufficient to remove any uncombined catalyst decomposition products.

The Rachapudy et al. article also discloses a method of preparation of a heterogeneous catalyst. A 1-liter high-pressure reactor (Parr Instrument Co.) was used. The catalysts were nickel on kieselguhr (Girdler Co.) and palladium on calcium carbonate (Strem Chemical Co.). Approximately 5 grams of polybutadiene were dissolved in 500 milliliters of dry cyclohexane, the catalyst was added (approximately 0.01 moles metal/mole of double bonds), and the reactor was purged with hydrogen. The reactor was then pressurized with hydrogen and the temperature was raised to the reaction temperature for 3 to 4 hours. For the nickel catalyst, the reaction conditions were 700 psi $H_2$ and 160° C. For palladium, the conditions were 500 psi $H_2$ and 70° C.

After reaction, the hydrogen was removed and the solution filtered at 70° C. The polymer was precipitated with methanol and dried under vacuum.

Additional teachings to hydrogenation processes and catalysts therefor are disclosed in U.S. Pat. Nos. 4,284,835 and 4,980,331, both of which are incorporated herein by reference in their entirety.

The hydrogenation catalysts described herein can be used to hydrogenate hydrocarbons containing unsaturated carbon bonds. The unsaturated carbon bonds which may be hydrogenated include olefinic and acetylenic unsaturated bonds. The process is particularly suitable for the hydrogenation under mild conditions of hydrogenatable organic materials having carbon-to-carbon unsaturation, such as acyclic monoolefins and polyolefins, cyclic monoolefins and polyolefins, and mixtures thereof. These materials may be unsubstituted or substituted with additional non-reactive functional groups such as halogens, ether linkages or cyano groups. Exemplary of the types of carbon-to-carbon compounds useful herein are hydrocarbons of 2 to 30 carbon atoms, e.g., olefinic compounds selected from acyclic and cyclic mono-, di-, and triolefins. The catalysts are also suitable for hydrogenating carbon-to-carbon unsaturation in polymeric materials, for example, in removing unsaturation from butadiene polymers and co-polymers such as styrene-butadiene-styrene.

The hydrogenation reaction herein is normally accomplished at a temperature from 40° C. to 160° C. and preferably from 60° C. to 150° C. Different substrates being hydrogenated will require different optimum temperatures, which can be determined by experimentation. The initial hydrogenation pressures may range up to 20.7 MPa partial pressure, at least part of which is present due to the hydrogen. Pressures from 0.0068 MPa to 51.7 MPa are suitable. Preferred pressures are up to 13.7 MPa, and most preferred pressures are from 0.68 to 6.8 MPa are employed. The reactive conditions are determined by the particular choices of reactants and catalysts. The process may be either batch or continuous. In a batch process, reaction times may vary widely, such as between 0.01 second to 10 hours. In a continuous process, reaction times may vary from 0.1 seconds to 120 minutes and preferably from 0.1 second to 10 minutes.

The ratio of catalyst to material being hydrogenated is generally not critical and may vary widely within the scope of the disclosure. Molar ratios of catalyst to material being hydrogenated between 1:1000 and 10:1 are found to be satisfactory; higher and lower ratios, however, are possible.

If desired, the hydrogenation process may be carried out in the presence of an inert diluent, for example, a paraffinic or cycloparaffinic hydrocarbon.

Additional teachings to hydrogenation processes and catalysts therefor are disclosed in U.S. Pat. No. 4,980,331, which is incorporated herein by reference in its entirety.

In general, any of the Group VIII metal compounds known to be useful in the preparation of catalysts for the hydrogenation of ethylenic unsaturation can be used separately or in combination to prepare the catalysts. Suitable compounds, then, include Group VIII metal carboxylates having the formula $(RCOO)_nM$, wherein M is a Group VIII metal, R is a hydrocarbyl radical having from 1 to 50 carbon atoms, preferably from 5 to 30 carbon atoms, and n is a number equal to the valence of the metal M; alkoxides having the formula $(RCO)_nM$, wherein M is again a Group VIII metal, R is a hydrocarbon radical having from 1 to 50 carbon atoms, preferably from 5 to 30 carbon atoms, and n is a number equal to the valence of the metal M; chelates of the metal prepared with beta-ketones, alpha-hydroxycarboxylic acids beta-hydroxycarboxylic acids, beta-hydroxycarbonyl compounds, and the like; salts of sulfur-containing acids having the general formula $M(SO_x)_n$ and partial esters thereof; and salts of aliphatic and aromatic sulfonic acids having from 1 to 20 carbon atoms. Preferably, the Group VIII metal will be selected from the group consisting of nickel and cobalt. Most preferably, the Group VIII metal will be nickel.

The metal carboxylates useful in preparing the catalyst include Group VIII metal salts of hydrocarbon aliphatic acids, hydrocarbon cycloaliphatic acids, and hydrocarbon aromatic acids. Examples of hydrocarbon aliphatic acids include hexanoic acid, ethylhexanoic acid, heptanoic acid, octanoic acid, nonanoic acid, decanoic acid, dodecanoic acid, myristic acid, palmitic acid, stearic acid, oleic acid, linoleic acid, and rhodinic acid. Examples of hydrocarbon aromatic acids include benzoic acid and alkyl-substituted aromatic acids in which the alkyl substitution has from 1 to 20 carbon atoms. Examples of cycloaliphatic acids include naphthenic acid, cyclohexylcarboxylic acid, and abietic-type resin acids. Suitable chelating agents which may be combined with various Group VIII metal compounds thereby yielding a Group VIII metal chelate compound useful in the preparation of the catalyst include beta-ketones, alpha-hydroxycarboxylic acids, beta-hydroxy carboxylic acids, and beta-hydroxycarbonyl compounds. Examples of beta-ketones that may be used include acetylacetone, 1,3-hexanedione, 3,5-nonadione, methylacetoacetate, and ethylacetoacetate. Examples of alpha-hydroxycarboxylic acids that may be used include lactic acid, glycolic acid, alpha-hydroxyphenylacetic acid, alpha-hydroxy-alpha-phenylacetic acid, and alpha-hydroxy-cyclohexylacetic acid. Examples of beta-hydroxycarboxylic acids include salicylic acid and alkyl-substituted salicylic acids. Examples of beta-hydroxylcarbonyl compounds that may be used include salicylaldehyde and θ-hydroxyacetophenone. The metal alkoxides useful in preparing the catalysts include Group VIII metal alkoxides of hydrocarbon aliphatic alcohols, hydrocarbon cycloaliphatic alcohols, and hydrocarbon aromatic alcohols. Examples of hydrocarbon aliphatic alcohols include hexanol, ethylhexanol, heptanol, octanol, nonanol, decanol, and dodecanol. The Group VIII metal salts of sulfur-containing acids and partial esters thereof include Group VIII metal salts of sulfonic acid, sulfuric acid, sulphurous acid, and partial esters thereof. Of the sulfonic acids, aromatic sulfonic acids such as benzene sulfonic acid and p-toluene sulfonic acid are particularly useful.

In general, any of the alkylalumoxane compounds known to be useful in the preparation of olefin polymerization catalysts may be used in the preparation of the hydrogenation catalyst. Alkylalumoxane compounds useful in preparing the catalyst may, then, be cyclic or linear. Cyclic alkylalumoxanes may be represented by the general formula $(R—Al—O)_m$ while linear alkylalumoxanes may be represented by the general formula $R(R—Al—O)_n AlR_2$. In both of the general formulae R will be an alkyl group having from 1 to 8 carbon atoms such as, for example, methyl, ethyl, propyl, butyl, and pentyl; m is an integer from 3 to 40; and n is an integer from 1 to 40. In a preferred embodiment, R will be methyl, m will be a number from 5 to 20, and n will be a number from 10 to 20. As is well known, alkylalumoxanes may be prepared by reacting an aluminum alkyl with water. Usually the resulting product will be a mixture of both linear and cyclic compounds.

Contacting of the aluminum alkyl and water may be accomplished in several ways. For example, the aluminum alkyl may first be dissolved in a suitable solvent such as toluene or an aliphatic hydrocarbon and the solution then contacted with a similar solvent containing relatively minor amounts of moisture. Alternatively, an aluminum alkyl may be contacted with a hydrated salt, such as hydrated copper sulfate or ferrous sulfate. When this method is used, a hydrated ferrous sulfate is frequently used. According to this method, a dilute solution of aluminum alkyl in a suitable solvent such as toluene is contacted with hydrated ferrous sulfate. In general, 1 mole of hydrated ferrous sulfate will be contacted with from 6 to 7 moles of the aluminum trialkyl. When aluminum trimethyl is the aluminum alkyl actually used, methane will be evolved as conversion of the aluminum alkyl to an alkylalumoxane occurs.

In general, any of the Group Ia, IIa, or IIIa metal alkyls or hydrides known to be useful in preparing hydrogenation catalysts in the prior art may be used to prepare the catalyst. In general, the Group Ia, IIa, or IIIa metal alkyls will be perkyls with each alkyl group being the same or different containing from 1 to 8 carbon atoms and the hydrides will be perhydrides although alkylhydrides should be equally useful. Aluminum, magnesium, and lithium alkyls and hydrides are particularly useful and these compounds are preferred for use in preparing the catalyst. Aluminum trialkyls are most preferred.

The one or more alkylalumoxanes and the one or more Group Ia, IIa, or IIIa metal alkyls or hydrides may be combined and then contacted with the one or more Group VIII metal compounds or the one or more alkylalumoxanes and the one or more Group Ia, IIa, or IIIa metal alkyls or hydrides may be sequentially contacted with the one or more Group VIII metal compounds with the proviso that when sequential contacting is used, the one or more alkylalumoxanes will be first contacted with the one or more Group VIII metal compounds. Sequential contacting is preferred. With respect to the contacting step the two different reducing agents, i.e., the alkylalumoxanes and the alkyls or hydrides, might react with the Group VIII metal compound in such a way as to yield different reaction products. The Group Ia, IIa, and IIIa metal alkyls and hydrides are a stronger reducing agent than the alkylalumoxanes, and, as a result, if the Group VIII metal is allowed to be completely reduced with a Group Ia, IIa, or IIIa metal alkyl or hydride, the alkylalumoxanes might make little or no contribution. If the Group VIII metal is first reduced with one or more alkylalumoxanes, the reaction product obtained with the alumoxane might be further reduced or otherwise altered by reaction with a Group Ia, IIa, or IIIa metal alkyl or hydride.

Whether contacting is accomplished concurrently or sequentially, the one or more alkylalumoxanes will be combined with the one or more Group VIII metal compounds at a concentration sufficient to provide an aluminum to Group VIII metal atomic ratio within the range from 1.5:1 to 20:1 and the one or more Group Ia, IIa, or IIIa metal alkyls or hydrides will be combined with one or more Group VIII metal compounds at a concentration sufficient to provide a Group Ia, IIa, or IIIa metal to Group VIII metal atomic ratio within the range from 0.1:1 to 20:1. Contact between the one or more Group VIII compounds and the one or more alkylalumoxanes and the one or more alkyls or hydrides will be accomplished at a temperature within the range from 20° C. and 100° C. Contact will typically be continued for a period of time within the range from 1 to 120 minutes. When sequential contacting is used, each of the two contacting steps will be continued for a period of time within this same range.

In general, the hydrogenation catalyst will be prepared by combining the one or more Group VIII metal compounds with the one or more alkylalumoxanes and the one or more Group Ia, IIa, or IIIa metal alkyls or hydrides in a suitable solvent. In general, the solvent used for preparing the catalyst may be anyone of those solvents known in the prior art to be useful as solvents for unsaturated hydrocarbon polymers. Suitable solvents include aliphatic hydrocarbons such as hexane, heptane, and octane; cycloaliphatic hydrocarbons such as cyclopentane and cyclohexane; alkyl-substituted cycloaliphatic hydrocarbons such as methylcyclopentane, methylcyclohexane, and methylcyclooctane; aromatic hydrocarbons such as benzene; hydroaromatic hydrocarbons such as decalin and tetralin; alkyl-substituted aromatic hydrocarbons such as toluene and xylene; halogenated aromatic hydrocarbons such as chlorobenzene; and linear and cyclic ethers such as the various dialkyl ethers, polyethers, particularly diethers, and tetrahydrofuran. Suitable hydrogenation catalysts will usually be prepared by combining the catalyst components in a separate vessel prior to feeding the same to the hydrogenation reactor.

Polymers Having Internal Unsaturations

Polymers having internal unsaturations are those olefin polymers that have at least one carbon-carbon double bond in the backbone of a polymer chain. Back bone carbon-carbon double bonds are distinguished from pendant unsaturations by either $^1$H NMR or $^{13}$C NMR. For example, protons at internal unsaturations typically are at 5.4 ppm while protons at pendant unsaturation sites typically are at 5.0 ppm.

In a preferred embodiment of the invention, unsaturated polydiene is useful as the polymers having internal unsaturations.

In a preferred embodiment of the invention, polymers of conjugated dienes are particularly useful. Preferred examples include polybutadiene, polyisobutylene, butyl rubber, polyisoprene, nitrile rubber, block copolymers having blocks of polyaromatices (such as polystyrene) and blocks of polydienes (such as polyisoprene, polybutadiene, SIS, SBS, etc.).

In an embodiment of the invention the polymer having internal unsaturations is polybutadiene, polyisoprene, and or nitrile rubber having a $M_w$ between 80,000 and 250,000 g/mol. Polymer or copolymer properties can include iodine values from 10 to 470 g $I_2$/100 g polymer.

In an embodiment of the invention, the polymer having internal unsaturations is one or more of styrenic block copolymer rubber (including SI, SIS, SB, SBS, SIBS and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, and polybutadiene rubber (both cis and trans).

In one embodiment, the polymer having internal unsaturations includes a styrenic block copolymer comprised of triblock segments comprised of styrene-derived units and at least one other unit selected from the group consisting of butadiene-derived units, isoprene-derived units, isobutylene-derived units and wherein the styrenic block copolymer is comprised of less than 20 wt % of diblock segments.

The term styrenic block copolymer (SBC) means a block copolymer of styrene and or alpha-methyl-styrene and an olefin such as an alpha olefin (ethylene, propylene, butene) or an alkadiene (isobutylene, isoprene, butadiene) and hydrogenated or chemically modified versions of the block copolymer. The block copolymers may be in diblock, triblock, linear (including tapered) or radial (including tapered) block form.

In a preferred embodiment, the SBC is an elastomeric styrenic block copolymer having an elongation at break of at least 500% and a tensile strength of at least 6 MPa measured according to ASTM D412. This definition specifically includes styrenic block copolymer rubbers such as SEBS, SEPS, SIS, SBS, SIBS and the like (for example, radial block copolymers), where S=styrene, EB=random ethylene+butene, EP=random ethylene+propylene, I=isoprene, and B=butadiene).

In a preferred embodiment, the SBC has a wt % styrene of 10 to 60 wt %, preferably 15 to 50 wt %, preferably at 20 to 40 wt %, based upon the weight of the SBC.

In a preferred embodiment, aromatic segments are present in the SBC at 10 to 85 wt %, preferably 15 to 50 wt %, preferably at 20 to 50 wt %, based upon the weight of the SBC.

In a preferred embodiment, the SBC comprises at least one block of styrene and at least one block of units selected from the group consisting of ethylene, butadiene, isoprene, and isobutylene, wherein the SBC comprises of from 10 to 85 wt % styrene, based upon the weight of the SBC.

Particularly preferred SBC's can include linear block copolymers, exemplified by the structural designations as A-B diblock copolymers, A-B-A triblock copolymers, A-B-A-B tetrablock copolymers, A-B-A-B-A pentablock copolymers, and so on. Such SBC's generally comprise a thermoplastic A block portion and an elastomeric B block portion. The hard A block portion generally comprises a polyvinylarene derived from monomers such as styrene, α-methyl styrene, other styrene derivatives, or mixtures thereof. In one embodiment, the hard A block portion can be polystyrene, having a number-average molecular weight between from about 1,000 to about 200,000, preferably from about 2,000 to about 100,000, more preferably from about 5,000 to about 60,000. Typically the hard A block portion comprises from about 5% to about 80%, preferably from about 10% to about 70%, more preferably from about 10% to about 50% of the total weight of the SBC.

The material forming the B block can have sufficiently low Tg at the use temperature of the polymer such that crystalline or glassy domains are not formed at these working temperatures. The B block may thus be regarded as a soft block. The soft B block portion is typically an olefinic polymer derived from conjugated aliphatic diene monomers of from about 4 to about 6 carbon atoms, linear alkene monomers of from about 2 to about 6 carbon atoms, or the like, including mixtures. Representative diene monomers include butadiene, isoprene, and the like. Representative alkene monomers include ethylene, propylene, butylene, and the like. The number average molecular weight of the soft B block is typically from about 1,000 to about 300,000, preferably from about 10,000 to about 200,000, and more preferably from about 20,000 to about 100,000. Typically the soft B block portion comprises from about 20% to about 90%, preferably from about 30% to about 80%, more preferably from about 40% to about 80% of the total weight of the SBC. In some embodiments, the soft B blocks comprise at least about 50% by weight of the SBC.

In another embodiment, the SBC's are triblock copolymers having an elastomeric midblock B and thermoplastic end-blocks A and A', wherein A and A' may be derived from the same or different vinylarene monomers.

The SBC's may also be radial, having three or more arms, each arm being a B-A, B-A-B-A, or the like type copolymer and the B blocks being at or near the center portion of the radial polymer. In other embodiments, the SBC's may have four, five, or six arms. The unsaturation in olefinic double bonds may be selectively hydrogenated to reduce sensitivity to oxidative degradation and may have beneficial effects on the elastomeric properties. For example, a polyisoprene block can be selectively reduced to form an ethylene-propylene block. In some embodiments, the vinylarene block typically comprises at least about 10% by weight of the SBC. However, higher vinylarene contents may be selected for high elastic and low stress relaxation properties.

Exemplary SBC's for use herein are commercially available from Dexco Polymers LP (Plaquemine, La.) under the tradename VECTOR™ and from Kraton Polymers (Houston, Tex.) under the tradename KRATON™, particularly Kraton 1641, 6944, 1650, 1657, 1651. SBC's can also be obtained from Total Petrochemicals under the tradename FINA-PRENE™ and from ASAHI in Japan, from Dynasol under the tradename Calprene, JSR under the tradename Dynaron, Polimeri under the name Europrene and TSRC under the name TAIPOL and Kuraray America, Inc. under the tradename SEPTON™.

In another embodiment of the invention, the polymer having internal unsaturations can be butyl rubber. Butyl rubber is a copolymer of a $C_4$ to $C_7$ isoolefin monomer component such as isobutylene with a multiolefin, or conjugated diene, monomer component, such as isoprene. The isoolefin is present in the range from 70 to 99.5 weight percent (preferably 85 to 99.5 weight percent), based upon the weight of the butyl rubber and the conjugated diene component is present at from 30 to 0.5 weight percent (preferably from 15 to 0.5 weight percent, preferably from 8 to 0.5 weight percent) based upon the weight of the butyl rubber. The isoolefin is a $C_4$ to $C_7$ compound such as isobutylene, isobutene 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene.

In a preferred embodiment of the invention, the polymer having internal unsaturations is one or more of polyisoprene rubber, polybutadiene rubber, styrene-butadiene rubber, butadiene-acrylonitrile rubber.

In a preferred embodiment of the invention, the polymer having internal unsaturations is one or more of: natural rubber (polyisoprene), butyl rubber, halobutyl rubber, halogenated rubber copolymer of p-alkystyrene and at least one $C_4$-$C_7$ isomonoolefin, a copolymer of isobutylene and divinyl-benzene, homopolymers of a conjugated diene (preferably a $C_4$-$C_8$ conjugated diene), copolymers of at least one conjugated diene and a comonomer (preferably where the copolymer has at least 50 wt % repeat units from at least one $C_4$-$C_8$ conjugated diene and/or the comonomer is a polar monomer, a $C_8$-$C_{12}$ vinyl aromatic monomer, an acrylonitrile monomer, a $C_3$-$C_8$ alkyl substituted acrylonitrile monomer, an unsaturated carboxylic acid monomer, an unsaturated anhydride of a dicarboxylic acid or a combination thereof), unsaturated non-polar elastomers, polybutadiene elastomer, styrene-butadiene elastomer and mixtures thereof.

In a preferred embodiment of the invention, the polymer having internal unsaturations has an $M_n$ of 1000 g/mol or more, preferably 5,000 g/mol or more, preferably 10,000 g/mol or more, preferably 55,000 g/mol or more, preferably 75,000 g/mol or more, preferably 100,000 g/mol or more and preferably 1,000,000 g/mol or less, preferably 500,000 g/mol or less.

Polymers Having Vinyl or Vinylidene Unsaturation

Polyolefins such as polyethylene that have been subjected to controlled rheology (such as thermal or peroxide degradation) can also be used with or in place of polymers with internal unsaturations.

Likewise, polymers having vinyl or vinylidene unsaturations can also be used with or in place of polymers with internal unsaturations.

In a preferred embodiment of the invention, polymers having allyl chain ends are used with or in place of polymers with internal unsaturations. Polymers having allyl chain ends include vinyl terminated macromonomers (also referred to as "vinyl terminated oligomers" or "macromers") and vinyl terminated polyolefins which comprise vinyl terminated macromonomers. Macromonomers having allyl chain ends (as defined below) are referred to as "vinyl terminated macromonomers". In embodiments herein, the vinyl terminated polyolefin comprises macromonomers having at least 5% (at least 10%, at least 15%, at least 20%, at least 30%, at least 40%, at least 50% at least 60% at least 70%; at least 80%, at least 90%, or at least 95%) allyl chain ends (relative to total unsaturation).

In some embodiments of the invention, the vinyl terminated macromonomers have a $M_n$ in the range of from about 300 g/mol to about 30,000 g/mol.

In some embodiments of the invention, the vinyl terminated macromonomers are a recycle stream from another process, such as a polyalphaolefin process, and may comprise a mixture of different macromonomers.

In some embodiments of the invention, the vinyl terminated macromonomer, includes, one or more of:

(i) a vinyl terminated polymer having an $M_n$ of at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;

(ii) a copolymer having an $M_n$ of 200 g/mol or more (measured by $^1$H NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends;

(iii) a copolymer having an $M_n$ of 200 g/mol or more (measured by $^1$H NMR), and comprises (a) from about 80 mol % to about 99.9 mol % of at least one $C_4$ olefin, and (b) from about 0.1 mol % to about 20 mol % of propylene; wherein the vinyl terminated macromonomer has at least 40% allyl chain ends relative to total unsaturation;

(iv) a co-oligomer having an $M_n$ of 200 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;

(v) a propylene oligomer, comprising more than 90 mol % propylene and less than 10 mol % ethylene wherein the oligomer has: at least 93% allyl chain ends, a number average molecular weight ($M_n$) of about 500 g/mol to about 20,000 g/mol, an isobutyl chain end to allylic vinyl group ratio of 0.8:1 to 1.35:1.0, and less than 100 ppm aluminum;

(vi) a propylene oligomer, comprising: at least 50 mol % propylene and from 10 mol % to 50 mol % ethylene, wherein the oligomer has: at least 90% allyl chain ends, an $M_n$ of about 150 g/mol to about 10,000 g/mol, and an isobutyl chain end to allylic vinyl group ratio of 0.8:1 to 1.2:1.0, wherein monomers having four or more carbon atoms are present at from 0 mol % to 3 mol %;

(vii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an $M_n$ of about 150 g/mol to about 10,000 g/mol, and an isobutyl chain end to allylic vinyl group ratio of 0.8:1 to 1.35:1.0;

(viii) a propylene oligomer, comprising: at least 50 mol % propylene, from 0.1 mol % to 45 mol % ethylene, and from 0.1 mol % to 5 mol % diene (preferably such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the oligomer has: at least 90% allyl chain ends, an $M_n$ of about 150 g/mol to about 10,000 g/mol, and an isobutyl chain end to allylic vinyl group ratio of 0.7:1 to 1.35:1.0;

(ix) a homo-oligomer, comprising propylene, wherein the oligomer has: at least 93% allyl chain ends, an $M_n$ of about 500 g/mol to about 20,000 g/mol, an isobutyl chain end to allylic vinyl group ratio of 0.8:1 to 1.2:1.0, and less than 1400 ppm aluminum;

(x) a co-oligomer having an $M_n$ ($^1$H NMR) of 7,500 to 60,000 g/mol comprising one or more alpha olefin derived units comprising ethylene and/or propylene, having 50% or greater allyl chain ends, relative to total number of unsaturated chain ends, and a g'vis of 0.90 or less (g'vis is determined using GPC-DRI, as described below);

(xi) a branched polyolefin having an $M_n$ (GPC-DRI) greater than 60,000 g/mol comprising one or more alpha olefins comprising ethylene and/or propylene, having: (i) 50% or greater allyl chain ends, relative to total unsaturated chain ends; (ii) a g'vis of 0.90 or less; and optionally, (iii) a bromine number which, upon complete hydrogenation, decreases by at least 50% (bromine number is determined by ASTM D 1159); and (xii) a branched polyolefin having an $M_n$ ($^1$H NMR) of less than 7,500 g/mol comprising one or more alpha olefin derived units comprising ethylene and/or propylene, having: a ratio of percentage of saturated chain ends to percentage of allyl chain ends of 1.2 to 2.0 and 50% or greater allyl chain ends, relative to total unsaturated chain ends.

Any of the vinyl terminated macromonomers described herein may be homopolymers, copolymers, terpolymers, and so on.

In any embodiment of the invention, the vinyl terminated macromonomers may have a Tg of less than 0° C. or less (as determined by differential scanning calorimetry as described below), preferably –10° C. or less, more preferably –20° C. or less, more preferably –30° C. or less, more preferably –50° C. or less.

In any embodiment of the invention, the vinyl terminated macromonomers described herein may have a melting point (DSC first melt, as described below) of from 60° C. to 130° C., alternately 50° C. to 100° C. In another embodiment, the vinyl terminated macromonomers described herein have no detectable melting point by DSC following storage at ambient temperature (23° C.) for at least 48 hours.

In any embodiment of the invention, the vinyl terminated macromonomers may be a liquid at 25° C. In any embodiment of the invention, the vinyl terminated macromonomers may have an isobutyl chain end to allylic vinyl group ratio of 0.7:1 to 1.35:1.0, preferably 0.8:1 to 1.35:1.0, and more preferably 0.8:1 to 1.2:1.0.

In any embodiment of the invention, the vinyl terminated macromonomers may have less than 3 wt % of functional groups selected from hydroxide, aryls and substituted aryls, halogens, alkoxys, carboxylates, esters, acrylates, oxygen, nitrogen, and carboxyl, preferably less than 2 wt %, more preferably less than 1 wt %, more preferably less than 0.5 wt %, more preferably less than 0.1 wt %, more preferably 0 wt %, based upon the weight of the oligomer.

Vinyl terminated macromonomers generally have a saturated chain end (or terminus) and/or an unsaturated chain end or terminus. The unsaturated chain end of the vinyl terminated macromonomer comprises an "allyl chain end" or a "3-alkyl" chain end. An allyl chain end is represented by $CH_2CH=CH_2$—, as shown in the formula:

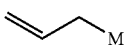

where M represents the polymer chain. "Allylic vinyl group," "allyl chain end," "vinyl chain end," "vinyl termination," "allylic vinyl group," and "vinyl terminated" are used interchangeably in the following description. The number of allyl chain ends, vinylidene chain ends, vinylene chain ends, and other unsaturated chain ends is determined using $^1$H NMR at 120° C. using deuterated tetrachloroethane as the solvent on an at least 250 MHz NMR spectrometer, and in selected cases, confirmed by $^{13}$C NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a BRUKER spectrometer operating at 500 MHz for proton and 125 MHz for carbon) for vinyl terminated oligomers in *J. American Chemical Soc.*, 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

A 3-alkyl chain end (where the alkyl is a $C_1$ to $C_{38}$ alkyl), also referred to as a "3-alkyl vinyl end group" or a "3-alkyl vinyl termination," is represented by the formula:

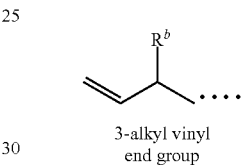

3-alkyl vinyl end group where "••••" represents the polyolefin chain and Rb is a $C_1$ to $C_{38}$ alkyl group, or a $C_1$ to $C_{20}$ alkyl group, such as methyl, ethyl, propyl, butyl, pentyl, hexyl, heptyl, octyl, nonyl, decyl, undecyl, dodecyl, and the like. The amount of 3-alkyl chain ends is determined using $^{13}$C NMR as set out below.

$^{13}$C NMR data is collected at 120° C. at a frequency of at least 100 MHz, using a BRUKER 400 MHz NMR spectrometer. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra is acquired with time averaging to provide a signal to noise level adequate to measure the signals of interest. Samples are dissolved in tetrachloroethane-$d_2$ at concentrations between 10 wt % to 15 wt % prior to being inserted into the spectrometer magnet. Prior to data analysis spectra are referenced by setting the chemical shift of the TCE solvent signal to 74.39 ppm. Chain ends for quantization were identified using the signals shown in the table below. N-butyl and n-propyl were not reported due to their low abundance (less than 5%) relative to the chain ends shown in the table below.

| Chain End | $^{13}$C NMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

The "allyl chain end to vinylidene chain end ratio" is defined to be the ratio of the percentage of allyl chain ends to the percentage of vinylidene chain ends. The "allyl chain end to vinylene chain end ratio" is defined to be the ratio of the percentage of allyl chain ends to the percentage of vinylene chain ends. Vinyl terminated macromonomers typically also have a saturated chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

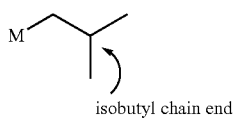

isobutyl chain end where M represents the polymer chain. Isobutyl chain ends are determined according to the procedure set out in WO 2009/155471. The "isobutyl chain end to allylic vinyl group ratio" is defined to be the ratio of the percentage of isobutyl chain ends to the percentage of allyl chain ends.

In polymerizations comprising $C_4$ or greater monomers (or "higher olefin" monomers), the saturated chain end may be a $C_4$ or greater (or "higher olefin") chain end, as shown in the formula below:

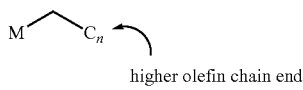

higher olefin chain end where M represents the polymer chain and n is an integer selected from 4 to 40. This is especially true when there is substantially no ethylene or propylene in the polymerization. In an ethylene/($C_4$ or greater monomer) copolymerization, the polymer chain may initiate growth in an ethylene monomer, thereby generating a saturated chain end which is an ethyl chain end. $M_n$ ($^1$H NMR) is determined according to the following NMR method. $^1$H NMR data is collected at either room temperature or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45° C., 8 seconds between pulses, and signal averaging 120 transients. Spectral signals are integrated and the number of unsaturation types per 1000 carbons is calculated by multiplying the different groups by 1000 and dividing the result by the total number of carbons. $M_n$ is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

Tm, Hf, and Tg are measured using Differential Scanning calorimetry (DSC) using commercially available equipment such as a TA Instruments Model Q100. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C. for 5 minutes, then heated at a heating rate of 10° C./min to 200° C., followed by an equilibration at 200° C. for 5 minutes, and cooled at 10° C./min to −80° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature associated with the largest endothermic calorimetric response in that range of temperatures from the DSC melting trace. Areas under the DSC curve are used to determine the heat of transition (heat of fusion, Hf, upon melting or heat of crystallization, Hc, upon crystallization, if the Hf value from the melting is different from the Hc value obtained for the heat of crystallization, then the value from the melting (Tm) shall be used), which can be used to calculate the degree of crystallinity (also called the percent crystallinity). The percent crystallinity (X %) is calculated using the formula: [area under the curve (in J/g)/H° (in J/g)]*100, where H° is the heat of fusion for the homopolymer of the major monomer component. These values for H° are to be obtained from the *Polymer Handbook, Fourth Edition*, published by John Wiley and Sons, New York 1999, except that a value of 290 J/g is used as the equilibrium heat of fusion (H°) for 100% crystalline polyethylene, a value of 140 J/g is used as the equilibrium heat of fusion (H°) for 100% crystalline polybutene, and a value of 207 J/g (H°) is used as the heat of fusion for a 100% crystalline polypropylene.

In some embodiments of the invention, the vinyl terminated macromonomer has an $M_n$ of at least 200 g/mol, (e.g., 200 g/mol to 100,000 g/mol, e.g., 200 g/mol to 75,000 g/mol, e.g., 200 g/mol to 60,000 g/mol, e.g., 300 g/mol to 60,000 g/mol, or e.g., 750 g/mol to 30,000 g/mol) (measured by $^1$H NMR) and comprise one or more (e.g., two or more, three or more, four or more, and the like) $C_4$ to $C_{40}$ (e.g., $C_4$ to $C_{30}$, $C_4$ to $C_{20}$, or $C_4$ to $C_{12}$, e.g., butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) olefin derived units, where the vinyl terminated macromonomer comprises substantially no propylene derived units (e.g., less than 0.1 wt % propylene, e.g., 0 wt %); and wherein the vinyl terminated macromonomer has at least 5% (at least 10%, at least 15%, at least 20%, at least 30%, at least 40%, at least 50%, at least 60%, at least 70%, at least 80%, at least 90%, or at least 95%) allyl chain ends (relative to total unsaturation); and optionally, an allyl chain end to vinylidene chain end ratio of 1:1 or greater (e.g., greater than 2:1, greater than 2.5:1, greater than 3:1, greater than 5:1, or greater than 10:1); and even further optionally, e.g., substantially no isobutyl chain ends (e.g., less than 0.1 wt % isobutyl chain ends). In some embodiments, the vinyl terminated macromonomers may also comprise ethylene derived units, e.g., at least 5 mol % ethylene (e.g., at least 15 mol % ethylene, e.g., at least 25 mol % ethylene, e.g., at least 35 mol % ethylene, e.g., at least 45 mol % ethylene, e.g., at least 60 mol % ethylene, e.g., at least 75 mol % ethylene, or e.g., at least 90 mol % ethylene). Such vinyl terminated macromonomers and methods to make them are further described in U.S. Ser. No. 13/072,288, filed on Mar. 25, 2011 (published as US 2012-0245312), which is hereby incorporated by reference.

In some embodiments of the invention, the vinyl terminated macromonomers may have an $M_n$ (measured by $^1$H NMR) of greater than 200 g/mol (e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprise:

(a) from about 20 mol % to 99.9 mol % (e.g., from about 25 mol % to about 90 mol %, from about 30 mol % to about 85 mol %, from about 35 mol % to about 80 mol %, from about 40 mol % to about 75 mol %, or from about 50 mol % to about 95 mol %) of at least one $C_5$ to $C_{40}$ (e.g., $C_6$ to $C_{20}$) higher olefin; and (b) from about 0.1 mol % to about 80 mol % (e.g., from about 5 mol % to about 70 mol %, from about 10 mol % to about 65 mol %, from about 15 mol % to about 55 mol %, from about 25 mol % to about 50 mol %, or from about 30 mol % to about 80 mol %) of propylene; wherein the vinyl terminated macromonomer has at least 40% allyl chain ends (e.g., at least 50% allyl chain ends, at least 60% allyl chain ends, at least 70% allyl chain ends, at least 80% allyl chain ends, at least 90% allyl chain ends, or at least 95% allyl chain ends) relative to total unsaturation; and, optionally, an isobutyl chain end to allyl chain end ratio of less than 0.70:1, less than 0.65:1, less than 0.60:1, less than 0.50:1, or less than 0.25:1; and further optionally, an allyl chain end to vinylidene chain end ratio of greater than 2:1 (e.g., greater than 2.5:1, greater than 3:1, greater than 5:1, or greater than 10:1); and even further optionally, an allyl chain end to vinylene ratio is greater than 1:1 (e.g., greater than 2:1 or greater than 5:1). Such macromonomers and methods to make them are further described in U.S. Ser. No. 13/072,249, filed on Mar. 25, 2011 (published as US 2012-0245310), hereby incorporated by reference.

In another embodiment of the invention, the vinyl terminated macromonomer has an $M_n$ of 300 g/mol or more (measured by $^1$H NMR, e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprises:

(a) from about 80 mol % to about 99.9 mol % of at least one $C_4$ olefin, e.g., about 85 mol % to about 99.9 mol %, e.g., about 90 mol % to about 99.9 mol %; and (b) from about 0.1 mol % to about 20 mol % of propylene, e.g., about 0.1 mol % to about 15 mol %, e.g., about 0.1 mol % to about 10 mol %;
wherein the vinyl terminated macromonomer has at least 40% allyl chain ends (e.g., at least 50% allyl chain ends, at least 60% allyl chain ends, at least 70% allyl chain ends, at least 80% allyl chain ends, at least 90% allyl chain ends, or at least 95% allyl chain ends) relative to total unsaturation; and in some embodiments, an isobutyl chain end to allyl chain end ratio of less than 0.70:1, less than 0.65:1, less than 0.60:1, less than 0.50:1, or less than 0.25:1; and in further embodiments, an allyl chain end to vinylidene group ratio of more than 2:1, more than 2.5:1, more than 3:1, more than 5:1, or more than 10:1. Such macromonomers and methods to make them are also further described in U.S. Ser. No. 13/072,249 filed on Mar. 25, 2011 (published as US 2012-0245310), hereby incorporated by reference.

In other embodiments of the invention, the vinyl terminated macromonomer is a propylene co-oligomer having an $M_n$ of 300 g/mol to 30,000 g/mol as measured by $^1$H NMR (e.g., 400 g/mol to 20,000 g/mol, e.g., 500 g/mol to 15,000 g/mol, e.g., 600 g/mol to 12,000 g/mol, e.g., 800 g/mol to 10,000 g/mol, e.g., 900 g/mol to 8,000 g/mol, e.g., 900 g/mol to 7,000 g/mol), comprising 10 mol % to 90 mol % propylene (e.g., 15 mol % to 85 mol %, e.g., 20 mol % to 80 mol %, e.g., 30 mol % to 75 mol %, e.g., 50 mol % to 90 mol %) and 10 mol % to 90 mol % (e.g., 85 mol % to 15 mol %, e.g., 20 mol % to 80 mol %, e.g., 25 mol % to 70 mol %, e.g., 10 mol % to 50 mol %) of one or more alpha-olefin comonomers (e.g., ethylene, butene, hexene, or octene, e.g., ethylene), wherein the oligomer has at least X % allyl chain ends (relative to total unsaturations), where: 1) X=(−0.94*(mol % ethylene incorporated)+100{alternately 1.20 (−0.94 (mol % ethylene incorporated)+100), alternately 1.50(−0.94 (mol % ethylene incorporated)+100)}), when 10 mol % to 60 mol % ethylene is present in the co-oligomer; 2) X=45 (alternately 50, alternately 60), when greater than 60 mol % and less than 70 mol % ethylene is present in the co-oligomer; and 3) X=(1.83*(mol % ethylene incorporated)−83, {alternately 1.20 [1.83*(mol % ethylene incorporated)−83], alternately 1.50 [1.83*(mol % ethylene incorporated)−83]}), when 70 mol % to 90 mol % ethylene is present in the co-oligomer. Such macromonomers and methods to make them are further described in U.S. Ser. No. 12/143,663, filed on Jun. 20, 2008, published as US 2009/0318644, hereby incorporated by reference.

In other embodiments of the invention, the vinyl terminated macromonomer is a propylene oligomer, comprising more than 90 mol % propylene (e.g., 95 mol % to 99 mol %, e.g., 98 mol % to 9 mol %) and less than 10 mol % ethylene (e.g., 1 mol % to 4 mol %, e.g., 1 mol % to 2 mol %), wherein the oligomer has: at least 93% allyl chain ends (e.g., at least 95%, e.g., at least 97%, e.g., at least 98%); a number average molecular weight ($M_n$) of about 400 g/mol to about 30,000 g/mol, as measured by $^1$H NMR (e.g., 500 g/mol to 20,000 g/mol, e.g., 600 g/mol to 15,000 g/mol, e.g., 700 g/mol to 10,000 g/mol, e.g., 800 g/mol to 9,000 g/mol, e.g., 900 g/mol to 8,000 g/mol, e.g., 1,000 g/mol to 6,000 g/mol); an isobutyl chain end to allylic vinyl group ratio of 0.8:1 to 1.35:1.0; and less than 1400 ppm aluminum, (e.g., less than 1200 ppm, e.g., less than 1000 ppm, e.g., less than 500 ppm, e.g., less than 100 ppm). Such macromonomers and methods to make them are further described in U.S. Ser. No. 12/143,663, filed on Jun. 20, 2008, published as US 2009/0318644, hereby incorporated by reference.

In other embodiments of the invention, the vinyl terminated macromonomer is a propylene oligomer, comprising: at least 50 mol % (e.g., 60 mol % to 90 mol %, e.g., 70 mol % to 90 mol %) propylene and from 10 mol % to 50 mol % (e.g., 10 mol % to 40 mol %, e.g., 10 mol % to 30 mol %) ethylene, wherein the oligomer has: at least 90% allyl chain ends (e.g., at least 91%, e.g., at least 93%, e.g., at least 95%, e.g., at least 98%); an $M_n$ of about 150 g/mol to about 20,000 g/mol, as measured by $^1$H NMR (e.g., 200 g/mol to 15,000 g/mol, e.g., 250 g/mol to 15,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.8:1 to 1.3:1.0, wherein monomers having four or more carbon atoms are present at from 0 mol % to 3 mol % (e.g., at less than 1 mol %, e.g., less than 0.5 mol %, e.g., at 0 mol %). Such macromonomers and methods to make them are further described in U.S. Ser. No. 12/143, 663, filed on Jun. 20, 2008, published as US 2009/0318644, hereby incorporated by reference.

In other embodiments of the invention, the vinyl terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) $C_4$ to $C_{12}$ olefin (such as butene, hexene, or octene, e.g., butene), wherein the oligomer has: at least 90% allyl chain ends (e.g., at least 91%, e.g., at least 93%, e.g., at least 95%, e.g., at least 98%); a number average molecular weight ($M_n$) of about 150 g/mol to about 15,000 g/mol, as measured by $^1$H NMR (e.g., 200 g/mol to 12,000 g/mol, e.g., 250 g/mol to 10,000 g/mol, e.g., 300 g/mol to 10,000 g/mol, e.g., 400 g/mol to 9500 g/mol, e.g., 500 g/mol to 9,000 g/mol, e.g., 750 g/mol to 9,000 g/mol); and an isobutyl chain end to allylic vinyl group ratio of 0.8:1 to 1.35:1.0. Such macromonomers and methods to make them are further described in U.S. Ser. No. 12/143,663, filed on Jun. 20, 2008, published as US 2009/0318644, hereby incorporated by reference.

In other embodiments of the invention, the vinyl terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the oligomer has at least 90% allyl chain ends (e.g., at least 91%, e.g., at least 93%, e.g., at least 95%, e.g., at least 98%); a number average molecular weight ($M_n$) of about 150 g/mol to about 20,000 g/mol, as measured by $^1$H NMR (e.g., 200 g/mol to 15,000 g/mol, e.g., 250 g/mol to 12,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.7:1 to 1.35:1.0. Such macromonomers and methods to make them are further described in U.S. Ser. No. 12/143,663, filed on Jun. 20, 2008, published as US 2009/0318644, hereby incorporated by reference.

In other embodiments of the invention, the vinyl terminated macromonomer is a propylene homo-oligomer, comprising propylene and less than 0.5 wt % comonomer, e.g., 0 wt % comonomer, wherein the oligomer has:

i) at least 93% allyl chain ends (e.g., at least 95%, e.g., at least 96%, e.g., at least 97%, e.g., at least 98%, e.g., at least 99%);

ii) a number average molecular weight ($M_n$) of about 500 g/mol to about 20,000 g/mol, as measured by $^1$H NMR (e.g., 500 g/mol to 15,000 g/mol, e.g., 700 g/mol to 10,000 g/mol, e.g., 800 g/mol to 8,000 g/mol, e.g., 900 g/mol to 7,000 g/mol, e.g., 1,000 g/mol to 6,000 g/mol, e.g., 1,000 g/mol to 5,000 g/mol);

iii) an isobutyl chain end to allylic vinyl group ratio of 0.8:1 to 1.3:1.0; and iv) less than 1400 ppm aluminum, (e.g., less than 1200 ppm, e.g., less than 1000 ppm, e.g., less than 500 ppm, e.g., less than 100 ppm). Such macromonomers and methods to make them are also further described in U.S. Ser. No. 12/143, 663, filed on Jun. 20, 2008, published as US 2009/0318644, hereby incorporated by reference.

In yet other embodiments of the invention, the vinyl terminated macromonomer is a branched polyolefin having an $M_n$ (measured by $^1$H NMR) of 7,500 to 60,000 g/mol, comprising one or more alpha olefins (preferably propylene and/or ethylene, preferably propylene) and, optionally, a $C_4$ to $C_{40}$ alpha olefin (preferably a $C_4$ to $C_{20}$ alpha olefin, preferably a $C_4$ to $C_{12}$ alpha olefin, preferably butene, pentene, hexene, heptene, octene, nonene, decene, cyclopentene, cycloheptene, cyclooctene, cyclooctadiene, and isomers thereof), and having:

(i) 50% or greater allyl chain ends, relative to total unsaturated chain ends (preferably 60% or more, preferably 70% or more, preferably 75% or more, preferably 80% or more, preferably 90% or more, preferably 95% or more);

(ii) a g'vis of 0.90 or less (preferably 0.85 or less, preferably 0.80 or less); and/or a ratio of percentage of saturated chain ends (preferably isobutyl chain ends) to percentage of allyl chain ends of 1.2 to 2.0 (preferably 1.6 to 1.8), wherein the percentage of saturated chain ends is determined using $^{13}$C NMR as described in WO 2009/155471 at paragraphs [0095] and [0096] except that the spectra are referenced to the chemical shift of the solvent, tetrachloroethane-$d_2$, and/or a ratio of $M_n$(GPC)/$M_n$($^1$H NMR) of 0.95 or less (preferably 0.90 or less, preferably 0.85 or less, preferably 0.80 or less);

(iii) optionally, a peak melting point (Tm) of greater than 60° C. (preferably greater than 100° C., preferably from 60° C. to 180° C., preferably from 80 to 175° C.);

(iv) optionally, a heat of fusion (Hf) of greater than 7 J/g (preferably greater than 15 J/g, greater than 30 J/g, greater than 50 J/g, greater than 60 J/g, or greater than 80 J/g);

(v) optionally, an allyl chain end to internal vinylidene ratio of greater than 5:1 (preferably greater than 10:1);

(vi) optionally, an allyl chain end to vinylidene chain end ratio of greater than 10:1 (preferably greater than 15:1); and (vii) optionally, an allyl chain end to vinylene chain end ratio of greater than 1:1 (preferably greater than 2:1, greater than 5:1, or greater than 10:1). Such macromonomers and methods to make them are further described in U.S. Ser. No. 13/411,929, filed on Mar. 5, 2012, which is incorporated in its entirety herein.

In other embodiments of the invention, the vinyl terminated macromonomer is a branched polyolefin having an $M_n$ (measured by GPC) of greater than 60,000 g/mol, comprising one or more alpha olefins (preferably propylene and/or ethylene, preferably propylene) and optionally, a $C_4$ to $C_{40}$ alpha olefin (preferably a $C_4$ to $C_{20}$ alpha olefin, preferably a $C_4$ to $C_{12}$ alpha olefin, preferably butene, pentene, hexene, heptene, octene, nonene, decene, cyclopentene, cycloheptene, cyclooctene, cyclooctadiene, and isomers thereof) and having:

(i) 50% or greater allyl chain ends, relative to total unsaturated chain ends (preferably 60% or more, preferably 70% or more, preferably 75% or more, preferably 80% or more, preferably 90% or more, preferably 95% or more);

(ii) a g'vis of 0.90 or less (preferably 0.85 or less, preferably 0.80 or less);

(iii) optionally, a bromine number which, upon complete hydrogenation, decreases by at least 50% (preferably at least 75%);

(iv) optionally, a Tm of greater than 60° C. (preferably greater than 100° C., preferably from 60° C. to 180° C., preferably from 80° C. to 175° C.); and (v) optionally, an Hf of greater than 7 J/g (preferably greater than 15 J/g, greater than 30 J/g, greater than 50 J/g, greater than 60 J/g, or greater than 80 J/g). Such macromonomers and methods to make them are further described in U.S. Ser. No. 13/411,929, filed on Mar. 5, 2012, which is incorporated in its entirety herein.

In yet other embodiments of the invention, the vinyl terminated macromonomer is a branched polyolefin having an $M_n$ (measured by $^1$H NMR) of less than 7,500 g/mol (preferably from 100 to 7,500 g/mol), comprising one or more alpha olefins (preferably propylene and/or ethylene, preferably propylene) and, optionally, a $C_4$ to $C_{40}$ alpha olefin (preferably a $C_4$ to $C_{20}$ alpha olefin, preferably a $C_4$ to $C_{12}$ alpha olefin, preferably butene, pentene, hexene, heptene, octene, nonene, decene, cyclopentene, cycloheptene, cyclooctene, cyclooctadiene, and isomers thereof) and having:

(i) 50% or greater allyl chain ends, relative to total number of unsaturated chain ends (preferably 60% or more, preferably 70% or more, preferably 75% or more, preferably 80% or more, preferably 90% or more, preferably 95% or more);

(ii) a ratio of percentage of saturated chain ends (preferably isobutyl chain ends) to percentage of allyl chain ends of 1.2 to 2.0 (preferably 1.6 to 1.8), wherein the percentage of saturated chain ends is determined using $^{13}$C NMR as described in WO 2009/155471 at paragraphs [0095] and [0096] except that the spectra are referenced to the chemical shift of the solvent, tetrachloroethane-$d_2$, and/or a ratio of $M_n$(GPC)/$M_n$ ($^1$H NMR) of 0.95 or less (preferably 0.90 or less, preferably 0.85 or less, preferably 0.80 or less);

(iii) optionally, a Tm of greater than 60° C. (preferably greater than 100° C., preferably from 60 to 180° C., preferably from 80 to 175° C.);

(iv) optionally, an Hf of greater than 7 J/g (preferably greater than 15 J/g, greater than 30 J/g, greater than 50 J/g, greater than 60 J/g, or greater than 80 J/g);

(v) optionally, an allyl chain end to internal vinylidene ratio of greater than 5:1 (preferably greater than 10:1);

(vi) optionally, an allyl chain end to vinylidene chain end ratio of greater than 10:1 (preferably greater than 15:1); and (vii) optionally, an allyl chain end to vinylene chain end ratio of greater than 1:1 (preferably greater than 2:1, greater than 5:1, or greater than 10:1). Such macromonomers and methods to make them are further described in U.S. Ser. No. 13/411,929, filed on Mar. 5, 2012, which is incorporated in its entirety herein.

In another embodiment, the vinyl terminated macromonomer may be a vinyl terminated ethylene macromonomer. In some embodiments, a phenoxyimine-based catalyst (a Mitsui FI catalyst) or a pyrroleimine-based catalyst (a Mitsui PI catalyst) can be used to prepare the vinyl terminated ethylene macromonomer. These catalysts comprise (a) a transition metal (preferably Ti) compound having phenoxyimine or pyrroleimine as a ligand, and (b) one or more kind(s) of compound selected from (b-1) an organic metal compound, (b-2) an organic aluminumoxy compound, and (b-3) a compound that reacts with the transition metal compound (a) to form an ion pair, as described in JP-A-2001-72706, JP-A-2002-332312, JP-A-2003-313247, JP-A-2004-107486, and JP-A-2004-107563. Herein, as the transition metal contained in the transition metal compound, the transition metal of Groups 3 to 11 in the periodic table can be used. Preferred catalysts to prepare the vinyl terminated ethylene macromonomer include those described in U.S. Pat. No. 7,795, 347, specifically at column 16, line 56 et seq. in Formula (XI).

In another embodiment, the vinyl terminated macromonomer may be a vinyl terminated isotactic polypropylene or a vinyl terminated polyethylene as disclosed in U.S. Pat. No. 6,444,773, U.S. Pat. No. 6,555,635, U.S. Pat. No. 6,147,180, U.S. Pat. No. 6,660,809, U.S. Pat. No. 6,750,307, U.S. Pat. No. 6,774,191, EP 0 958 309, and U.S. Pat. No. 6,169,154, which are incorporated by reference herein.

In a preferred embodiment any vinyl terminated macromonomer described herein can be fractionated or distilled by any means know in the art and one or more of the fractions may be used in the invention described herein. Preferred fractions typically have a narrow $M_w/M_n$, such as less than 1.5, preferably 1.4 or less, preferably 1.3 or less, preferably 1.2 or less. Alternately, the $M_w/M_n$ is from 1 to 1.4, preferably 1.05 to 1.3, preferably 1.1 to 1.2.

Functionalized Polymer

In a preferred embodiment of the invention, the functionalized polyolefin has an acid number from 10 to 100, for example, from 20 to 60. Acid number is determined according to ASTM D974.

Phase Transfer Catalysts

Since the polymer and the oxidizing agent are often not soluble in a common reaction medium, the reaction benefits from the use of two liquid solvent phases which are at least partially miscible, and a phase transfer catalyst which is soluble in the same liquid phase as the oxidizing agent and forms a complex therewith which is soluble in the other liquid phase. The complex transfers into the other liquid phase where the oxidizing agent oxidizes sites of unsaturation and creates desired pendant functionality, e.g., aldehyde, ketone, or carboxylic acid groups.

The selection of the water-soluble phase transfer catalyst will depend upon the identity of the reactant with which it must complex. The phase transfer catalyst useful in the present invention preferably comprises a salt compound, more preferably a Group 15 salt compound, and most preferably a quaternary ammonium salt compound. Examples of phase transfer catalysts useful in two phase reactions include (but are not limited to): tetrabutyl ammonium bromide, tetrabutyl ammonium bisulfate, tetrabutyl ammonium hydroxide, benzyl triethyl ammonium chloride, tetrabutyl phosphonium bromide, etc. A particularly preferred phase transfer catalyst is tetrabutyl ammonium bromide.

The molar ratio of the phase transfer catalyst to oxidant will preferably be in the range from about 0.1 to about 1, more preferably from about 0.2 to about 0.8, and most preferably from about 0.3 to about 0.5.

Reaction temperatures will range from about 20° C. to about 150° C., preferably from about 50° C. to about 100° C., preferably from about 75° C. to about 85° C. The temperatures are for non-flux conditions.

Derivatized Functionalized Polymers

The functionalized polymers prepared herein can be used in oil additives, as anti-fogging or wetting additives, adhesion promoters and many other applications. Preferred uses include additives for lubricants and or fuels, as plasticizers, surfactants for soaps, detergents, fabric softeners, antistatics, etc.

The functionalized polymer can in turn be derivatized with a derivatizing compound. (For purposes of this invention and the claims thereto the term functionalized polymer encompasses derivatized polymer.) The derivatizing compound can react with the functional groups of the functionalized polymer by means such as nucleophilic substitution, Mannich Base condensation, and the like. The derivatizing compound can be polar and/or contain reactive derivative groups. Preferred derivatizing compounds are selected from hydroxy containing compounds, amines, metal salts, anhydride containing compounds and acetyl halide containing compounds. The derivatizing compounds can comprise at least one nucleophilic group and preferably at least two nucleophilic groups. A typical derivatized polymer is made by contacting a functionalized polymer, i.e., substituted with a carboxylic acid or ketone, with a nucleophilic reagent, e.g., amine, alcohol, including polyols, amino alcohols, reactive metal compounds and the like. (For more information please see U.S. Pat. No. 6,022,929 column 33, line 27 to column 74, line 63.) Alternately, a derivatized polymer may be made by contacting a functionalized polymer, substituted with a carboxylic acid or ketone, with a nucleophilic reagent, e.g., amine, to make a quaternary ammonium compound or amine oxide.

The functionalized polymers and/or derivatized polymers have uses as lubricating additives which can act as dispersants, viscosity index improvers, or multifunctional viscosity index improvers. Additionally, they may be used as disinfectants (functionalized amines) and or wetting agents.

Functionalized polymers and/or derivatized polymers having uses as dispersants typically have $M_n$'s (g/mol) of less than 20,000, preferably less than 10,000 and most preferably less than 8,000 and typically can range from 500 to 10,000 (e.g., 500 to 5,000), preferably from 1,000 to 8,000 (e.g., 1,000 to 5,000) and most preferably from 1,500 to 6,000 (e.g., 1,500 to 3,000).

The functionalized polymers and/or derivatized polymers described herein having $M_n$'s (g/mol) of greater than 10,000, preferably greater than 10,000 to 30,000 (preferably 20,000 to 30,000) are useful for viscosity index improvers for lubricating oil compositions, adhesive additives, antifogging and wetting agents, ink and paint adhesion promoters, coatings, tackifiers and sealants, and the like. In addition, such polymers may be functionalized and derivatized to make multifunctional viscosity index improvers which also possess dispersant properties. (For more information please see U.S. Pat. No. 6,022,929.)

The functionalized polymers and/or derivatized polymers described herein may be combined with other additives (such as viscosity index improvers, corrosion inhibitor, oxidation inhibitor, dispersant, lube oil flow improver, detergents, demulsifiers, rust inhibitors, pour point depressant, antifoaming agents, antiwear agents, seal swellant, friction modifiers, and the like (described, for example, in U.S. Pat. No. 6,022,929 at column 60, line 42 through column 78, line 54 and the references cited therein)) to form compositions for many applications, including but not limited to lube oil additive packages, lube oils, and the like.

Compositions containing these additives are typically blended into the base oil in amounts which are effective to provide their normal attendant function. Representative effective amounts of such additives are illustrated as follows:

| Compositions | (Typical) wt % * | (Preferred) wt %* |
| --- | --- | --- |
| V.I. Improver | 1-12 | 1-4 |
| Corrosion Inhibitor | 0.01-3 | 0.01-1.5 |
| Oxidation Inhibitor | 0.01-5 | 0.01-1.5 |
| Dispersant | 0.1-10 | 0.1-5 |
| Lube Oil Flow Improver | 0.01-2 | 0.01-1.5 |
| Detergents and Rust inhibitors | 0.01-6 | 0.01-3 |
| Pour Point Depressant | 0.01-1.5 | 0.01-1.5 |
| Anti-Foaming Agents | 0.001-0.1 | 0.001-0.01 |
| Antiwear Agents | 0.001-5 | 0.001-1.5 |
| Seal Swellant | 0.1-8 | 0.1-4 |
| Friction Modifiers | 0.01-3 | 0.01-1.5 |
| Lubricating Base Oil | Balance | Balance |

*Wt %'s are based on active ingredient content of the additive, and/or upon the total weight of any additive-package, or formulation which will be the sum of the A.I. weight of each additive plus the weight of total oil or diluent.

When other additives are employed, it may be desirable, although not necessary, to prepare additive concentrates comprising concentrated solutions or dispersions of the subject additives of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The subject functionalized or derivatized polymers of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil. The final formulations may employ typically about 10 wt % of the additive-package with the remainder being base oil.

Coupling Agents

In one aspect, the functionalized polymers described herein can be reacted with an amount of one or more multifunctional coupling agents, e.g., trifunctional silane, triols, tricarboxylic acid, tricarbonyl chloride coupling agents or tetrafunctional coupling agents, under conditions sufficient to produce a dendritic hydrocarbon polymer. A separate hydrogenation step is necessary to deliver substantially saturated polyolefins.

The one or more multifunctional coupling agents useful in the processes of this disclosure can be any trifunctional or tetrafunctional coupling agents, or coupling agents with functionalities equal to or greater than 3, that are capable of reacting with a telechelic hydrocarbon polymer. Illustrative trifunctional coupling agents include, for example, trifunctional silanes, such as trichloromethylsilane, trichloroethoxysilane, 1-dichloromethyl-2-chlorodimethyl-disiloxane, 1-dichloromethylsilyl-2-chlorodimethylsilyl ethane, or triols, such as glycerol, 1,3,5-benzenetriol, 1,2,6-hexanetriol, 1,1,1-tris(hydroxymethyl)propane, or tricarboxylic acids and tricarbonyl chlorides, such as 1,2,4-benzenecarboxylic anhydride, 1,2,4-benzenecarboxylic acid, 1,3,5-benzenetricarboxylic acid, and trimesoyl chloride. Among the trifunctional silane coupling agents, preferred ones are selected from within the structure $X_3Si(CH_2)_nH$ or $X_2(CH_3)_2Si$—$(CH_2)_n$—$Si(CH_3)_2X$, wherein n is greater than or equal to 0 and X is a halogen or an alkoxy, and $Cl(CH_3)_2Si$—$(CH_2)_n$—$SiCl(CH_3)$—$(CH_2)_n$—$SiCl(CH_3)_2$, wherein n is greater than or equal to 0. Useful trifunctional coupling agents are disclosed, for example, in U.S. Pat. No. 5,360,875 and U.S. Patent Publication Nos. 2011/0118420 and 2013/0172493, the disclosures of which are incorporated herein by reference in their entirety.

Dendritic or Highly Branched Polymer

The functionalized polymers prepared herein can be used to produce dendritic or highly branched polymer which in turn is useful as a polymer additive. In particular, such dendritic or highly branched polymer is useful to modify ethylene polymers (such as linear low density polyethylene) as described in the Polyethylene Blends section below.

Blends

In another embodiment, the functionalized polymer and or derivatized polymer produced herein is combined with one or more additional polymers prior to being formed into a film, molded part or other article. Such additional polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the functionalized polymer and derivatized polymer are present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %, with the balance being made up by the additional polymers.

The blends described above may be produced by mixing the polymers of the invention with one or more additional polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Polyethylene Blends

In a particularly preferred embodiment of the invention, the functionalized polymer and or dendritic or highly branched polymer produced herein (referred to as "modifiers") can be blended with ethylene polymers to improve processability, bubble stability and physical properties of the ethylene polymer, such as haze and tensile strength. Thus, this invention relates to polyethylene compositions comprising one or more ethylene polymers (preferably linear ethylene polymers) and one or more modifiers (also referred to as the "modifier" or the "branched modifier").

In a preferred embodiment of the invention, this invention relates to a composition comprising:

1) from 99.99 wt % to 50 wt % (preferably from 75 wt % to 99.9 wt %, preferably from 90 wt % to 99.9 wt %, preferably from 95 wt % to 99.5 wt %, preferably from 96 wt % to 99.5 wt %, preferably from 97 wt % to 99.5 wt %, preferably from 98 wt % to 99 wt %), based upon the weight of the blend, of an ethylene polymer having:
    a) a branching index, $g'_{vis}$, (determined according to the procedure described in the Test Method section below) of 0.95 or more, preferably 0.97 or more, preferably 0.98 or more, preferably 0.99 or more;
    b) a density of 0.860 to 0.980 g/cc (preferably from 0.880 to 0.940 g/cc, preferably from 0.900 to 0.935 g/cc, preferably from 0.910 to 0.930 g/cc);
    c) an $M_w$ of 20,000 g/mol or more (preferably 20,000 to 2,000,000 g/mol, preferably 30,000 to 1,000,000 g/mol, more preferably 40,000 to 200,000 g/mol, preferably 50,000 to 750,000 g/mol); and 2) from 0.01 wt % to 50 wt % (preferably from 0.1 wt % to 25 wt %, preferably from 0.1 wt % to 10 wt %, preferably from 0.25 wt % to 9 wt %, preferably from 0.5 wt % to 8 wt %, preferably from 0.5 wt % to 7 wt %, preferably from 1 wt % to 6 wt %), based upon the weight of the blend, of one or more of the modifier(s) produced herein, wherein the modifier has: 1) a melt index (ASTM 1238, 190° C., 2.16 kg) of less than 0.7 dg/min (preferably less than 0.6 dg/min, preferably less than 0.5 dg/min) and 2) a branching index, $g'_{vis}$, of less than 0.96, (preferably less than 0.95, preferably less than 0.90, preferably less than 0.85, preferably less than 0.80, preferably less than 0.75).

Ethylene Polymers

In one aspect of the invention, the ethylene polymer is selected from ethylene homopolymer, ethylene copolymers, and blends thereof. Useful copolymers comprise one or more comonomers in addition to ethylene and can be a random copolymer, a statistical copolymer, a block copolymer, and/or blends thereof. In particular, the ethylene polymer blends described herein may be physical blends or in situ blends of more than one type of ethylene polymer or blends of ethylene polymers with polymers other than ethylene polymers where the ethylene polymer component is the majority component (e.g., greater than 50 wt %). The method of making the polyethylene is not critical, as it can be made by slurry, solution, gas phase, high pressure, or other suitable processes, and by using catalyst systems appropriate for the polymerization of polyethylenes, such as Ziegler-Natta-type catalysts, chromium catalysts, metallocene-type catalysts, other appropriate catalyst systems, or combinations thereof, or by free-radical polymerization. In a preferred embodiment, the ethylene polymers are made by the catalysts, activators, and processes described in U.S. Pat. Nos. 6,342,566; 6,384,142; 5,741,563; PCT publications WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Preferred ethylene polymers and copolymers that are useful in this invention include those sold by ExxonMobil Chemical Company in Houston Tex., including those sold as ExxonMobil HDPE, ExxonMobil LLDPE, and ExxonMobil LDPE; and those sold under the ENABLE™, EXACT™, EXCEED™, ESCORENE™, EXXCO™, ESCOR™, PAXON™, and OPTEMA™ tradenames.

In a preferred embodiment of the invention, the polyethylene copolymers preferably have a composition distribution breadth index (CDBI) of 60% or more, preferably 60% to 80%, preferably 65% to 80%. In another preferred embodiment, the ethylene copolymer has a density of 0.910 to 0.950 g/cm³ (preferably 0.915 to 0.940 g/cm³, preferably 0.918 to 0.925 g/cm³) and a CDBI of 60% to 80%, preferably between 65% and 80%. Preferably, these polymers are metallocene polyethylenes (mPEs).

In another embodiment, the ethylene copolymer comprises one or more mPEs described in U.S. Patent Application Publication No. 2007/0260016 and U.S. Pat. No. 6,476,171, e.g., copolymers of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g., triethylaluminum, trimethylaluminum, tri-isobutyl aluminum, tri-n-hexylaluminum, and the like), which polymer has a Melt Index of from 0.1 to 15 (ASTM D 1238, condition E); a CDBI of at least 70%, a density of from 0.910 to 0.930 g/cc; a Haze (ASTM D1003) value of less than 20; a Melt Index ratio (I21/I2, ASTMD 1238) of from 35 to 80; an averaged Modulus (M) (as defined in U.S. Pat. No. 6,255,426) of from 20,000 to 60,000 psi (13790 to 41369 N/cm$^2$); and a relation between M and the Dart Impact Strength (26 inch, ASTM D 1709) in g/mil (DIS) complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm, M is the averaged Modulus in psi and DIS is the 26 inch (66 cm) dart impact strength. (See U.S. Pat. No. 6,255,426 for further description of such ethylene polymers.)

In another embodiment, the ethylene polymer comprises a Ziegler-Natta polyethylene, e.g., CDBI less than 50, preferably having a density of 0.910 to 0.950 g/cm$^3$ (preferably 0.915 to 0.940 g/cm$^3$, preferably 0.918 to 0.925 g/cm$^3$).

In another embodiment, the ethylene polymer comprises olefin block copolymers as described in EP 1 716 190.

In another embodiment, the ethylene polymer is produced using chrome based catalysts, such as, for example, in U.S. Pat. No. 7,491,776, including that fluorocarbon does not have to be used in the production. Commercial examples of polymers produced by chromium include the Paxon™ grades of polyethylene produced by ExxonMobil Chemical Company, Houston Tex.

In another embodiment, the ethylene polymer comprises ethylene and an optional comonomer of propylene, butene, pentene, hexene, octene, nonene, or decene, and said polymer has a density of more than 0.86 to less than 0.910 g/cm$^3$, an $M_w$ of 20,000 g/mol or more (preferably 50,000 g/mol or more) and a CDBI of 90% or more.

In another embodiment, the ethylene polymer comprises substantially linear and linear ethylene polymers (SLEPs). Substantially linear ethylene polymers and linear ethylene polymers and their method of preparation are fully described in U.S. Pat. Nos. 5,272,236; 5,278,272; 3,645,992; 4,937,299; 4,701,432; 4,937,301; 4,935,397; 5,055,438; EP 129,368; EP 260,999; and WO 90/07526, which are fully incorporated herein by reference. As used herein, "a linear or substantially linear ethylene polymer" means a homopolymer of ethylene or a copolymer of ethylene and one or more alpha-olefin comonomers having a linear backbone (i.e., no cross linking), a specific and limited amount of long-chain branching or no long-chain branching, a narrow molecular weight distribution, a narrow composition distribution (e.g., for alpha-olefin copolymers) or a combination thereof. More explanation of such polymers is discussed in U.S. Pat. No. 6,403,692, which is incorporated herein by reference for all purposes.

Preferred ethylene homopolymers and copolymers useful in this invention typically have:

1. an $M_w$ of 20,000 g/mol or more, preferably 20,000 to 2,000,000 g/mol, preferably 30,000 to 1,000,000, preferably 40,000 to 200,000, preferably 50,000 to 750,000, as measured by size exclusion chromatography according to the procedure described below in the Test Methods section; and/or
2. an $M_w/M_n$ of 1 to 40, preferably 1.6 to 20, more preferably 1.8 to 10, more preferably 1.8 to 4, preferably 8 to 25, as measured by size exclusion chromatography as described below in the Test Methods section; and/or
3. a $T_m$ of 30° C. to 150° C., preferably 30° C. to 140° C., preferably 50° C. to 140° C., more preferably 60° C. to 135° C., as determined by the DSC method described below in the Test Methods section; and/or
4. a crystallinity of 5% to 80%, preferably 10% to 70%, more preferably 20% to 60% (alternatively, the polyethylene may have a crystallinity of at least 30%, preferably at least 40%, alternatively at least 50%, where crystallinity is determined by the DSC method described below in the Test Methods section); and/or
5. a heat of fusion of 300 J/g or less, preferably 1 to 260 J/g, preferably 5 to 240 J/g, preferably 10 to 200 J/g, as measured by the DSC method described below in the Test Methods section; and/or
6. a crystallization temperature (Tc) of 15° C. to 130° C., preferably 20° C. to 120° C., more preferably 25° C. to 110° C., preferably 60° C. to 125° C., as measured by the method described below in the Test Methods section; and/or
7. a heat deflection temperature of 30° C. to 120° C., preferably 40° C. to 100° C., more preferably 50° C. to 80° C., as measured according to ASTM D648 on injection molded flexure bars, at 66 psi load (455 kPa); and/or
8. a Shore hardness (D scale) of 10 or more, preferably 20 or more, preferably 30 or more, preferably 40 or more, preferably 100 or less, preferably from 25 to 75 (as measured by ASTM D 2240); and/or
9. a percent amorphous content of at least 50%, alternatively at least 60%, alternatively at least 70%, even alternatively between 50% and 95%, or 70% or less, preferably 60% or less, preferably 50% or less, as determined by subtracting the percent crystallinity from 100 as described in the Test Methods section below; and/or
10. a branching index ($g'_{vis}$) of 0.97 or more, preferably 0.98 or more, preferably 0.99 or more, preferably 1, as measured using the method described below in the Test Methods section; and/or
11. a density of 0.860 to 0.980 g/cc (preferably from 0.880 to 0.940 g/cc, preferably from 0.900 to 0.935 g/cc, preferably from 0.910 to 0.930 g/cc) (alternately from 0.85 to 0.97 g/cm$^3$, preferably 0.86 to 0.965 g/cm$^3$, preferably 0.88 to 0.96 g/cm$^3$, alternatively between 0.860 and 0.910 g/cm$^3$, alternatively between 0.910 and 0.940 g/cm$^3$, or alternatively between 0.94 to 0.965 g/cm$^3$) (determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm$^3$).

The polyethylene may be an ethylene homopolymer, such as HDPE. In another embodiment, the ethylene homopolymer has a molecular weight distribution ($M_w/M_n$) of up to 40, preferably ranging from 1.5 to 20, from 1.8 to 10 in another embodiment, from 1.9 to 5 in yet another embodiment, and from 2.0 to 4 in yet another embodiment. In another embodiment, the 1% secant flexural modulus (determined according to ASTM D-882-10) of the ethylene polymer falls in a range of 200 to 1000 MPa, from 300 to 800 MPa in another embodiment, and from 400 to 750 MPa in yet another embodiment, wherein a desirable polymer may exhibit any combination of any upper flexural modulus limit with any lower flexural modulus limit. The melt index (MI) of preferred ethylene homopolymers range from 0.05 to 800 dg/min in one embodiment and from 0.1 to 100 dg/min in another embodiment, as measured according to ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, preferably 0 mol % propylene units).

In another embodiment of the invention, the ethylene polymer is an ethylene copolymer, either random or block, of ethylene and one or more comonomers selected from $C_3$ to $C_{20}$ α-olefins, typically from $C_3$ to $C_{10}$ α-olefins in another embodiment. Preferably, the comonomers are present from 0.1 wt % to 50 wt % of the copolymer in one embodiment, from 0.5 wt % to 30 wt % in another embodiment, from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably, the ethylene copolymer will have a weight average molecular weight of from greater than 8,000 g/mol in one embodiment, greater than 10,000 g/mol in another embodiment, greater than 12,000 g/mol in yet another embodiment, greater than 20,000 g/mol in yet another embodiment, and less than 1,000,000 g/mol in yet another embodiment, less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from 0 wt % to 40 wt %, more preferably from 0.5 wt % to 30 wt %, more preferably from 2 wt % to 30 wt %, more preferably from 5 wt % to 20 wt %.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene.

In a particularly desirable embodiment, the ethylene polymer used herein is a plastomer having a density of 0.91 g/cm³ or less, as determined by ASTM D1505, and a melt index (MI) between 0.1 and 50 dg/min, as determined by ASTM D1238 (190° C., 2.16 kg). In one embodiment, the useful plastomer is a copolymer of ethylene and at least one $C_3$ to $C_{12}$ α-olefin, preferably $C_4$ to $C_8$ α-olefins. The amount of $C_3$ to $C_{12}$ α-olefin present in the plastomer ranges from 2 wt % to 35 wt % in one embodiment, from 5 wt % to 30 wt % in another embodiment, from 15 wt % to 25 wt % in yet another embodiment, and from 20 wt % to 30 wt % in yet another embodiment.

Preferred plastomers useful in the invention have a melt index of between 0.1 and 40 dg/min in one embodiment, from 0.2 to 20 dg/min in another embodiment, and from 0.5 to 10 dg/min in yet another embodiment. The average molecular weight of preferred plastomers ranges from 10,000 to 800,000 g/mole in one embodiment and from 20,000 to 700,000 g/mole in another embodiment. The 1% secant flexural modulus (ASTM D-882-10) of preferred plastomers ranges from 5 MPa to 100 MPa in one embodiment and from 10 MPa to 50 MPa in another embodiment. Further, preferred plastomers that are useful in compositions of the present invention have a melting temperature ($T_m$) of from 30° C. to 100° C. in one embodiment and from 40° C. to 80° C. in another embodiment. The degree of crystallinity of preferred plastomers is between 3% and 30%.

Particularly preferred plastomers useful in the present invention are synthesized using a single-site catalyst, such as a metallocene catalyst; comprise copolymers of ethylene and higher α-olefins such as propylene, 1-butene, 1-hexene, and 1-octene, and which contain enough of one or more of these comonomer units to yield a density between 0.86 and 0.91 g/cm³ in one embodiment. The molecular weight distribution ($M_w/M_n$) of desirable plastomers ranges from 1.5 to 5 in one embodiment and from 2.0 to 4 in another embodiment. Examples of commercially available plastomers are EXACT™ 4150, a copolymer of ethylene and 1-hexene, the 1-hexene derived units making up from 18 wt % to 22 wt % of the plastomer and having a density of 0.895 g/cm³ and MI of 3.5 dg/min (ExxonMobil Chemical Company, Houston, Tex.); EXACT™ 8201, a copolymer of ethylene and 1-octene, the 1-octene derived units making up from 26 wt % to 30 wt % of the plastomer; and having a density of 0.882 g/cm³ and MI of 1.0 dg/min (ExxonMobil Chemical Company, Houston, Tex.).

The melt index (MI) of preferred ethylene polymers, as measured according to ASTM D1238 (190° C., 2.16 kg), ranges from 0.02 dg/min to 800 dg/min in one embodiment, from 0.05 to 500 dg/min in another embodiment, and from 0.1 to 100 dg/min in another embodiment. In another embodiment of the present invention, the polyethylene has a MI of 20 dg/min or less, 7 dg/min or less, 5 dg/min or less, or 2 dg/min or less, or less than 2 dg/min. In yet another embodiment, the polymer has a Mooney viscosity, ML(1+4) @ 125° C. (measured according to ASTM D1646) of 100 or less, 75 or less, 60 or less, or 30 or less.

The following embodiments, numbered as paragraphs 1 through 31 provide for various aspects described herein.

1. A process to produce a functionalized polymer comprising:
   a) contacting an iodine modified aromatic polymer with an oxidizing agent to obtain an iodonium salt of the aromatic polymer;
   b) contacting the iodonium salt of the aromatic polymer with a polymer having internal or terminal unsaturation(s); and
   c) obtaining a functionalized polymer from the polymer having internal or terminal unsaturation(s) wherein the functionalized polymer has an $M_n$ less than the $M_n$ of the polymer having internal or terminal unsaturation(s) and the functionalized polymer has an acid number higher than the acid number of the polymer having internal or terminal unsaturation(s).

2. The process of paragraph 1, further comprising a phase transfer catalyst in step a).

3. The process of paragraph 1 or 2, wherein the polymer having internal or terminal unsaturation(s) is a polydiene or a vinyl or vinylidene terminated macromonomer (VTM).

4. The process of any of paragraphs 1 through 3, further comprising contacting the functionalized polymer with a coupling agent and obtaining a polymer having an $M_n$ higher than the functionalized polymer and having a $g'_{(Zave)}$ less than the starting polymer.

5. The process of any of paragraphs 1 through 4, wherein the oxidizing agent is one or more of a persulfate, hemi persulfate, persulfate salt, hydrogen peroxide, hydroperoxide (such as cumene hydroperoxide,) acyl peroxide or a peroxymonosulfate.

6. Use of the product of paragraph 3 as a modifier for ethylene polymers.

7. The process of any of paragraphs 1 through 5, wherein the ratio of oxidizing agent to unsaturations in the polymer having an internal or terminal unsaturation of step c) is from 0.5:1 to 10:1, preferably 1:1 to 1:8, preferably 2:1 to 4:1.

8. The process of any of paragraphs 1 through 5 and 7, wherein the iodine modified polymer is present in bead form or fixed bed form.

9. The process of any of paragraphs 2 through 5, 7, and 8, wherein the phase transfer catalyst is a quaternary ammonium salt or a phosphonium salt.

10. The process of any of paragraphs 1 through 5 or 7 through 9, wherein the aromatic polymer is polystyrene or a poly paraphenylene terephthalamide.

11. The process of any of paragraphs 1 through 5 or 7 through 10, wherein the polymer is the polydiene.

12. The process of any of paragraphs 1 through 5 or 7 through 11, wherein the functionalized polymer is obtained from a polydiene and has an $M_n$ of approximately half of the $M_n$ of the starting polydiene polymer and the functionalized polymer has an acid number higher than the acid number of the starting polymer.

13. The process of any of paragraphs 1 through 5 or 7 through 12, further comprising the step of hydrogenating the functionalized polymer with a hydrogenation reagent to provide a hydrogenated functionalized polymer.

14. The process of paragraph 13, wherein the hydrogenation reagent is a hydrazine.

15. The process of paragraph 13, wherein the hydrogenated functionalized polymer has an $M_n$ of approximately half of the $M_n$ of the starting polymer and the hydrogenated functionalized polymer has an acid number higher than the acid number of the starting polymer.

16. A process to produce a functionalized polymer comprising:

1) contacting a first polymer having internal or terminal unsaturation(s), said first polymer having an $M_n$ of at least 50 g/mol as determined by GPC, with a complexing agent and an oxidizing agent to obtain a second polymer having internal or terminal functionality and an $M_n$ of the same of 90% or less than the first polymer; and 2) contacting the second polymer with an oxidizing agent comprising an iodine containing compound and an optional phase transfer catalyst to obtain a cleaved functionalized polymer having an $M_n$ less than that of the $M_n$ of the first polymer.

17. The process of paragraph 16, wherein the first polymer having internal or terminal unsaturation(s) is a polydiene or a vinyl or vinylidene terminated macromonomer (VTM).

18. The process of either paragraph 16 or 17, wherein the cleaved functionalized polymer has an acid number higher than the acid number of the first polymer.

19. The process of any of paragraphs 16 through 18, wherein the complexing agent is a metal or organometallic complex.

20. The process of paragraph 19, wherein the complexing agent is ruthenium chloride.

21. The process of any of paragraphs 16 through 20, wherein the oxidizing agent is a periodate.

22. The process of any of paragraphs 16 through 21, wherein the phase transfer catalyst is a quaternary ammonium salt or a phosphonium salt.

23. The process of any of paragraphs 16 through 22, wherein the polymer is a polydiene.

24. The process of any of paragraphs 16 through 23, wherein the cleaved functionalized polymer is obtained from a polydiene and has an $M_n$ dependent upon the amount of oxidizing agent used in the process on a molar basis based on the percent unsaturation of the polydiene and wherein the functionalized polymer has an acid number higher than the acid number of the starting polymer.

25. The process of any of paragraphs 16 through 24, further comprising the step of hydrogenating the functionalized polymer with a hydrogenation reagent to provide a hydrogenated functionalized polymer.

26. The process of paragraph 25, wherein the hydrogenation reagent is a hydrazine.

27. The process of paragraph 26, wherein the hydrogenated functionalized polymer has an $M_n$ proportional to molar ratio of oxidizing agent to degree of unsaturation of the polydiene and the hydrogenated functionalized polymer has an acid number higher than the acid number of the starting polymer.

28. A process to produce a functionalized polymer comprising contacting a first polymer comprising a vinyl terminated macromonomer (VTM) having an $M_n$ of at least 50 g/mol as determined by GPC with an oxidizing agent comprising an iodine containing compound and an optional phase transfer catalyst to obtain a functionalized polymer.

29. The process of paragraph 28, wherein the oxidizing agent is a periodate.

30. The process of any either paragraphs 28 or 29, wherein the phase transfer catalyst is a quaternary ammonium salt or phosphonium salt.

31. The process of any of paragraphs 28 through 30, wherein the functionalized polymer has an acid number higher than the acid number of the first polymer.

Tests and Materials

Unless otherwise stated, polymer molecular weight (weight-average molecular weight, $M_w$, number-average molecular weight, $M_n$, and Z-averaged molecular weight, $M_z$) and molecular weight distribution ($M_w/M_n$) are determined using Gel Permeation Chromatography-Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer. Three Polymer Laboratories PLgel 10 mm Mixed-B columns are used. The nominal flow rate is 0.5 cm$^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC.

Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration can range from 1.0 to 2.0 mg/ml, with lower concentrations being used for higher molecular weight samples.

Prior to running each sample the DRI detector and the injector are purged. Flow rate in the apparatus is then increased to 0.5 ml/minute and the DRI is allowed to stabilize for 8 to 9 hours before injecting the first sample. The LS laser is turned on 1 to 1.5 hours before running samples.

The concentration, c, at each point in the chromatogram is calculated from the DRI signal after subtracting the prevailing baseline, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the LS analysis. The processes of subtracting the prevailing baseline (i.e., background signal) and setting integration limits that define the starting and ending points of the chromatogram are well known to those familiar with SEC analysis. Units on parameters throughout this description of the SEC method are such that concentration is expressed in g/cm$^3$, molecular weight is expressed in g/mole, and intrinsic viscosity is expressed in dL/g.

The light scattering detector is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 135° C. and λ=690 nm. In addition, $A_2$=0.0015 and (dn/dc)=0.104 for polyethylene in TCB at 135° C.; both parameters may vary with average composition of an ethylene copolymer. Thus, the molecular weight determined by LS analysis is calculated by solving the above equations for each point in the chromatogram; together these allow for calculation of the average molecular weight and molecular weight distribution by LS analysis.

A high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer at each point in the chromatogram, $(\eta_s)_i$, is calculated from the ratio of their outputs. The intrinsic viscosity at each point in the chromatogram, $[\eta]_i$, is calculated by solving the following equation (for the positive root) at each point i:

$$(\eta_s)_i = c_i [\eta]_i + 0.3 (c_i [\eta]_i)^2$$

where $c_i$ is the concentration at point i as determined from the DRI analysis.

The branching index ($g'_{vis}$) is calculated using the output of the SEC-DRI-LS-VIS method (described above) as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index g' is defined as:

$$g'_{vis} = \frac{[\eta]_{avg}}{k M_v^\alpha}$$

where the Mark-Houwink parameters k and α are given by k=0.00592, a=0.463. The hydrogenated polybutadiene based modifier can be represented as a butene copolymer for these calculations with 12% butene. $M_v$ is the viscosity-average molecular weight based on molecular weights determined by LS analysis. Z average branching index ($g'_{Zave}$) is calculated using Ci=polymer concentration in the slice i in the polymer peak times the mass of the slice squared, Mi$^2$, e.g. $g'_{Zave}$=(Ci)(Mi$^2$).

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001 volume 34(19), pp. 6812-6820).

Proton NMR spectra were collected using a 500 MHz Varian pulsed fourier transform NMR spectrometer equipped with a variable temperature proton detection probe operating at 120° C. The polymer sample is dissolved in 1,1,2,2-tetrachloroethane-d2 (TCE-d2) and transferred into a 5 mm glass NMR tube. Typical acquisition parameters are sweep width=10 KHz, pulse width=30 degrees, acquisition time=2 s, acquisition delay=5 s and number of scans=120. Chemical shifts are determined relative to the TCE-d2 signal which is set to 5.98 ppm.

In conducting the $^{13}$C NMR investigations, samples are prepared by adding about 0.3 g sample to approximately 3 g of tetrachloroethane-d2 in a 10 mm NMR tube. The samples are dissolved and homogenized by heating the tube and its contents to 150° C. The data are collected using a Varian spectrometer, with corresponding $^1$H frequencies of either 400 or 700 MHz (in event of conflict, 700 MHz shall be used). The data are acquired using nominally 4000 transients per data file with a about a 10 second pulse repetition delay. To achieve maximum signal-to-noise for quantitative analysis, multiple data files may be added together. The spectral width was adjusted to include all the NMR resonances of interest and FIDs were collected containing a minimum of 32K data points. The samples are analyzed at 120° C. in a 10 mm broad band probe.

Peak melting point, Tm, (also referred to as melting point), peak crystallization temperature, Tc, (also referred to as crystallization temperature), glass transition temperature (Tg), heat of fusion (ΔHf or Hf), and percent crystallinity were determined using the following DSC procedure according to ASTM D3418-03. Differential scanning calorimetric (DSC) data were obtained using a TA Instruments model Q200 machine. Samples weighing approximately 5 mg to 10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided however, that a value of 140 J/g (B) is used as the heat of fusion for 100% crystalline polybutene, a value of 207 J/g (B) is used as the heat of fusion for 100% crystalline polypropylene, and a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

EXPERIMENTAL

Example 1

A flask was charged with 9.9652 g (0.1845 mol butadiene repeating units) of a cis-1,4-polybutadiene (obtained from Aldrich) and 125 mL toluene at 60° C. under an inert nitrogen atmosphere. Upon dissolution, 94 mL of water was added. The biphasic mixture was stirred and 0.0128 g crosslinked iodo-polystyrene (obtained from Aldrich) was added to the reaction mixture. To the flask was also added 2.3616 g of Oxone™ (Potassium peroxymonosulfate obtained from Aldrich) and 1.62 g tetrabutylammonium bromide as a phase transfer catalyst. The reaction was stirred vigorously at 60° C. for overnight, after which it was cooled down to room temperature and slowly added dropwise to a stirring solution of about 2 L methanol containing a small amount of 1 M HCl aqueous solution. The solvent was decanted. After drying overnight in a 40° C. vacuum oven, 10.45 g product (denoted as "cleaved PBd", or "c-PBd") was received as a white solid (quantitative yield).

A flask was charged with 511.9 mg of the above product (c-PBd), 10.35 g (55.8 mmol) p-toluenesulfonyhydrazide and 75 mL toluene under an inert nitrogen atmosphere. A crystal of butylated hydroxytoluene (BHT) was also added to the mixture. To induce dissolution, the mixture was heated to reflux. Upon dissolution, 10.6 mL (55.8 mmol) of tripropylamine was added to the reaction mixture. The mixture was stirred vigorously under nitrogen at reflux for 5 hours. After 5 hours, the reaction mixture was allowed to cool to room temperature. The reaction mixture was made slightly acidic upon the addition of 1 M HCl aqueous solution. The solution was concentrated down to 4 mL. The concentrated solution was then added slowly to a stirring 500 mL methanol to induce precipitation. The white solid was filtered, affording 0.4615 g hydrogenated product (90% yield) (denoted as "hydrogenated cleaved PBd", or "h-c-PBd") after dried overnight in a 40° C. vacuum oven.

A flask was charged with 511.9 mg of the original cis-1,4-polybutadiene, 10.35 g (55.8 mmol) p-toluenesulfonyhydrazide and 75 mL toluene under an inert nitrogen atmosphere. A crystal of butylated hydroxytoluene (BHT) was also added to the mixture. To induce dissolution, the mixture was heated to reflux. Upon dissolution, 10.6 mL (55.8 mmol) of tripropylamine was added to the reaction mixture. The mixture was stirred vigorously under nitrogen at reflux for 5 hours. After 5 hours, the reaction mixture was allowed to cool to room temperature. The reaction mixture was made slightly acidic upon the addition of 1 M HCl aqueous solution. The solution was concentrated down to 4 mL. The concentrated solution was then added slowly to a stirring 500 mL methanol to induce precipitation. The white solid was filtered, affording a hydrogenated PBd (denoted as "h-PBd") after dried overnight in a 40° C. vacuum oven.

$^1$H NMR of the product (FIG. 1) indicated the product h-c-PBd was fully saturated and contained a triplet peak that is the signature of $CH_2$ next to carboxylic acid. This peak did not exist in the starting material cis-1,4-polybutadiene. As indicated by GPC-3D, the hydrogenated cis-1,4-polybutadiene (h-PBd) had an $M_n$ of 96,000 g/mol and an $M_w$ of 273,000 g/mol. The hydrogenated cleaved product (h-c-PBd) has an $M_n$ of 58,000 g/mol and an $M_w$ of 126,000 g/mol. The GPC-3D results implied the starting material PBd was cleaved nearly in half. Both the NMR and GPC results confirmed the oxidative cleavage process in this Example successfully degraded the starting polybutadiene and generated polar functional groups at the chain ends.

Example 2

Oxidative Cleavage

A flask was charged with 1 g of cis-1,4-polybutadiene and 20 mL of 1,1,2,2-tetrachloroethane at 60° C. under an inert nitrogen atmosphere. Upon dissolution 10 mL deionized water was added. The biphasic mixture was stirred and 3.2 mg $RuCl_3.H_2O$ was added to the reaction mixture. 94.3 mg (0.441 mmol) sodium periodate ($NaIO_4$) was added to the flask. 162 mg tetrabutyl ammonium bromide was also added to the flask. The reaction was stirred vigorously at 60° C. for 30 minutes, after which 188.7 mg (0.882 mmol) $NaIO_4$ was added. After 24 hours, the reaction mixture was slowly added dropwise to a stirring solution of 1 L methanol containing a small amount of 1M HCl aqueous solution. The solvent was decanted and the brown solid transformed into a dark brown viscous solid upon drying at 40° C. under vacuum. The total cleaved product c-PBd was 0.6 g (60% yield).

Hydrogenation

A flask was charged with 200 mg of the above product, 2.07 g (11.1 mmol) and combined with p-toluenesulfonyhydrazide and 20 mL toluene under an inert nitrogen atmosphere. A crystal of BHT was also added to the mixture. To induce dissolution, the mixture was heated to reflux. Upon dissolution, 2.1 mL (11.1 mmol) tripropylamine was added to the reaction mixture. The mixture was stirred vigorously under reflux for 5 hours. After 5 hours, the reaction mixture was allowed to cool to room temperature. The reaction mixture was made slightly acidic upon the addition of 1M HCl aqueous solution. The solution was concentrated down to 3 mL. The concentrated solution was added slowly to a stirring 500 mL methanol to induce precipitation. The brownish solid was filtered, affording 172 mg hydrogenated cleaved product h-c-PBd (86% yield) after drying in a 40° C. vacuum oven.

Figure 4:
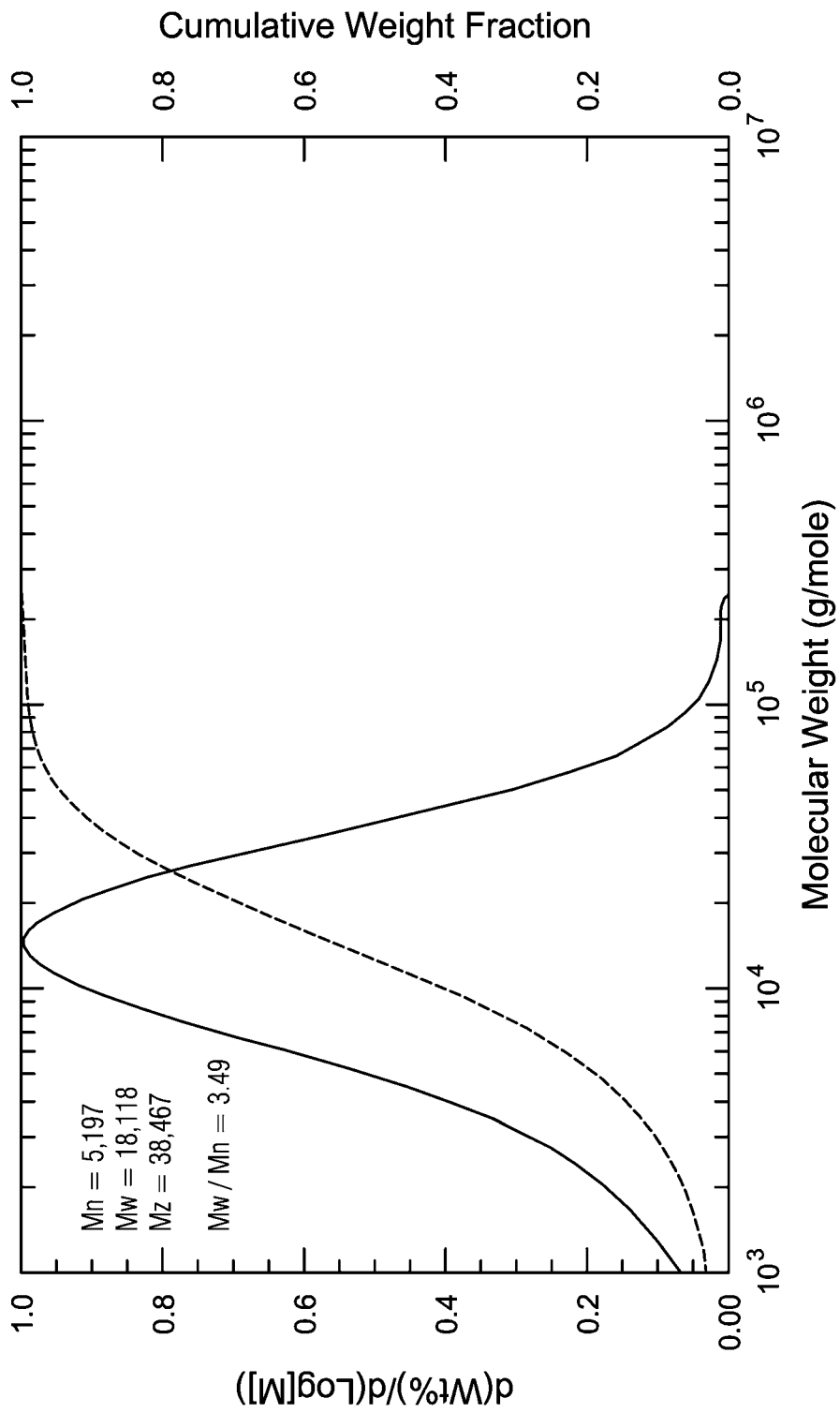
FIG. 4 is a GPC of hydrogenated and cleaved polymer from Example 2.
Figure 5A:
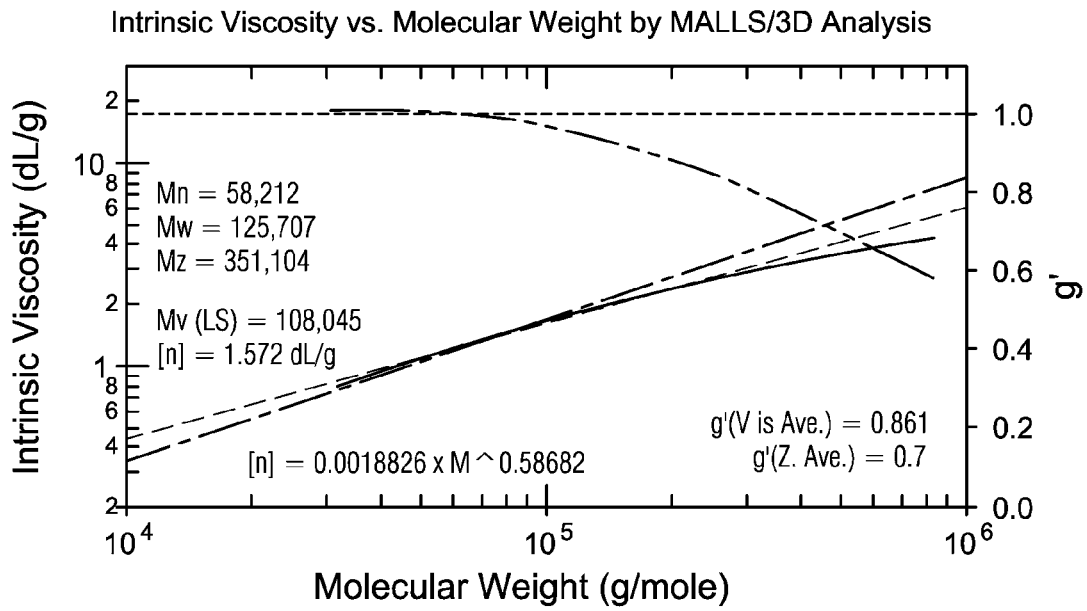
FIG. 5A is a plot of intrinsic viscosity versus molecular weight from the GPC-3D of hydrogenated and cleaved polymer from Example 1.
Figure 5B:
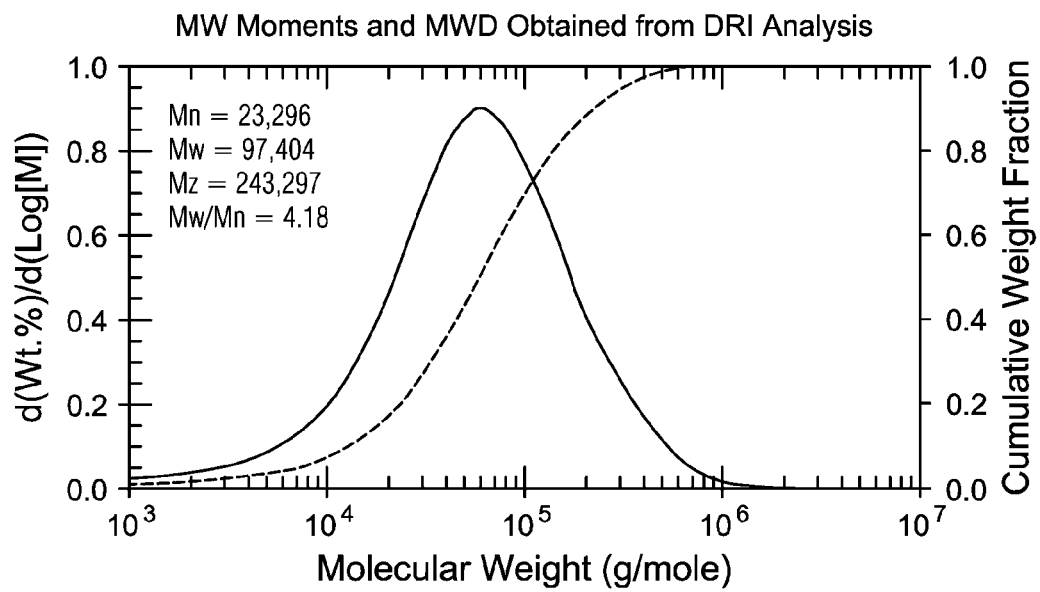
FIG. 5B is a plot of d(Wt. %)/d(Log [M]) versus molecular weight from the GPC-3D of hydrogenated and cleaved polymer from Example 1.
Figure 5C:
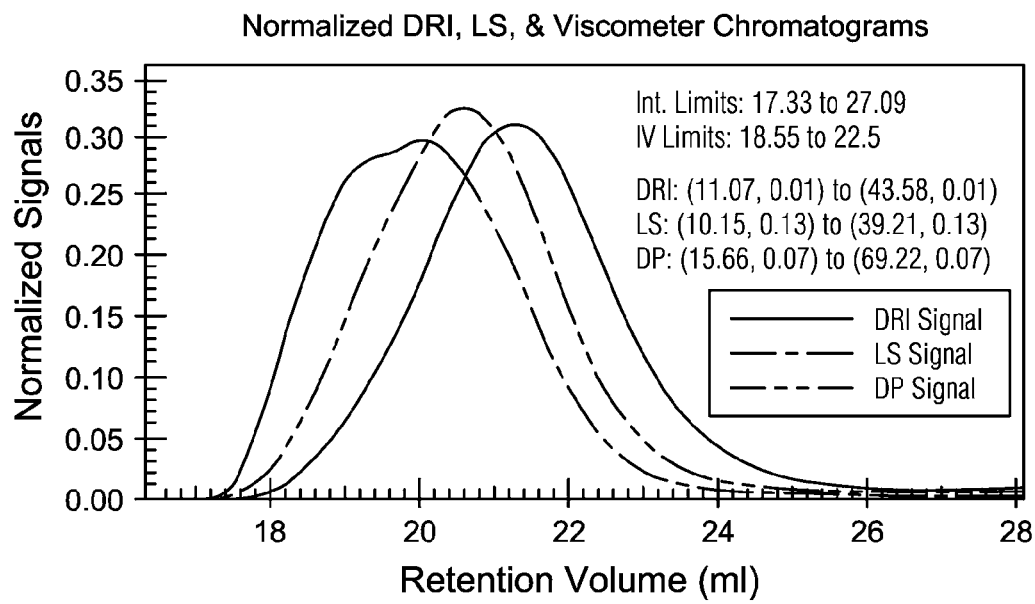
FIG. 5C is s a plot of the normalized signals versus the retention volume from the GPC-3D of hydrogenated and cleaved polymer from Example 1.

$^1$H NMR of the product h-c-PBd indicated the product was fully saturated and contained signature peaks of $CH_2$ protons next to carboxylic acid. This peak did not exist in the starting material. Based on this peak, the NMR-calculated number average molecular weight of the hydrogenated cleaved product h-c-PBd is 6,600 g/mol. GPC of the hydrogenated cleaved product h-c-PBd (FIG. 4) indicated it has a number average molecular weight of 5,000 g/mol and a weight average molecular weight of 18,000 g/mol. Both the NMR and GPC results confirmed the oxidative cleavage process in this Example successfully degraded the starting PBd and generated polar functional groups (most probably carboxylic acids) at the chain ends.

For purposes of the claims, Gel Permeation Chromatography-Size-Exclusion Chromatography is used to determine molecular weight, unless otherwise clearly indicated, such as when using VTM starting materials clearly indicating $^1$H NMR is used to determine Mn of the VTM.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

The invention claimed is:

1. A process to produce a functionalized polymer comprising:
   a) contacting an iodine modified aromatic polymer with an oxidizing agent to obtain an iodonium salt of the aromatic polymer;
   b) contacting the iodonium salt of the aromatic polymer with a polymer having internal or terminal unsaturation(s); and
   c) obtaining a functionalized polymer from the polymer having internal or terminal unsaturation(s) wherein the functionalized polymer has an $M_n$ less than the $M_n$ of the polymer having internal or terminal unsaturation(s) and the functionalized polymer has an acid number higher than the acid number of the polymer having internal or terminal unsaturation(s), wherein the aromatic polymer comprises a phenyl group.

2. The process of claim 1, further comprising a phase transfer catalyst in step a).

3. The process of claim 1, wherein the polymer having internal or terminal unsaturation(s) is a polydiene, a vinylidene terminated macromonomer, or a vinyl terminated macromonomer.

4. The process of claim 1, further comprising contacting the functionalized polymer with a coupling agent and obtaining a polymer having an $M_n$ higher than the functionalized polymer and having a $g'_{(Zave)}$ less than the starting polymer.

5. The process of claim 1, wherein the oxidizing agent is one or more of a persulfate, hemi persulfate, persulfate salt, hydrogen peroxide, hydroperoxide, acyl peroxide or a peroxymonosulfate.

6. A process to modify ethylene polymer comprising blending ethylene polymer with the product of claim 3.

7. The process of claim 1, wherein the ratio of oxidizing agent to unsaturations in the polymer having an internal or terminal unsaturation of step c) is from 0.5:1 to 10:1.

8. The process of claim 1, wherein the iodine modified polymer is present in bead form or fixed bed form.

9. The process of claim 2, wherein the phase transfer catalyst is a quaternary ammonium salt or a phosphonium salt.

10. The process of claim 1, wherein the aromatic polymer is polystyrene.

11. The process of claim 1, wherein the polymer having internal or terminal unsaturation(s) is a polydiene.

12. The process of claim 1, wherein the functionalized polymer is obtained from a polydiene and has an $M_n$ of approximately half of the $M_n$ of the starting polydiene polymer and the functionalized polymer has an acid number higher than the acid number of the starting polymer.

13. The process of claim 1, further comprising the step of hydrogenating the functionalized polymer with a hydrogenation reagent to provide a hydrogenated functionalized polymer.

14. The process of claim 13, wherein the hydrogenation reagent is a hydrazine.

15. The process of claim 13, wherein the hydrogenated functionalized polymer has an $M_n$ of approximately half of the $M_n$ of the starting polymer and the hydrogenated functionalized polymer has an acid number higher than the acid number of the starting polymer.

16. A process to produce a functionalized polymer comprising:
   1) contacting a first polymer having internal or terminal unsaturation(s), said first polymer having an $M_n$ of at least 50 g/mol as determined by GPC, with a complexing agent and an oxidizing agent to obtain a second polymer having internal or terminal functionality and an $M_n$ of the same of 90% or less than the first polymer; and
   2) contacting the second polymer with an oxidizing agent comprising an iodine containing compound and an optional phase transfer catalyst to obtain a cleaved functionalized polymer having an $M_n$ less than that of the $M_n$ of the first polymer.

17. The process of claim 16, wherein the first polymer having internal or terminal unsaturation(s) is a polydiene, a vinylidene terminated macromonomer, or a vinyl terminated macromonomer.

18. The process of claim 16, wherein the cleaved functionalized polymer has an acid number higher than the acid number of the first polymer.

19. The process of claim 16, wherein the complexing agent is a metal or organometallic complex.

20. The process of claim 19, wherein the complexing agent is ruthenium chloride.

21. The process of claim 16, wherein the oxidizing agent is a periodate.

22. The process of claim 16, wherein the phase transfer catalyst is a quaternary ammonium salt or a phosphonium salt.

23. The process of claim 16, wherein the first polymer having internal or terminal unsaturation(s) is a polydiene.

24. The process of claim 16, wherein the cleaved functionalized polymer is obtained from a polydiene and has an $M_n$ dependent upon the amount of oxidizing agent used in the process on a molar basis based on the percent unsaturation of the polydiene and wherein the functionalized polymer has an acid number higher than the acid number of the starting polymer.

25. The process of claim 16, further comprising the step of hydrogenating the functionalized polymer with a hydrogenation reagent to provide a hydrogenated functionalized polymer.

26. The process of claim 25, wherein the hydrogenation reagent is a hydrazine.

27. The process of claim 26, wherein the hydrogenated functionalized polymer has an $M_n$ proportional to molar ratio of oxidizing agent to degree of unsaturation of the polydiene and the hydrogenated functionalized polymer has an acid number higher than the acid number of the starting polymer.

28. A process to produce a functionalized polymer comprising contacting a first polymer comprising a vinyl terminated macromonomer having an $M_n$ of at least 50 g/mol as determined by GPC with an oxidizing agent comprising an iodine containing compound and an optional phase transfer catalyst to obtain a functionalized polymer.

29. The process of claim 28, wherein the oxidizing agent is a periodate.

30. The process of claim 28, wherein the phase transfer catalyst is a quaternary ammonium salt or phosphonium salt.

31. The process of claim 28, wherein the functionalized polymer has an acid number higher than the acid number of the first polymer.

32. The process of claim 1, wherein the aromatic polymer is a poly paraphenylene terephthalamide.

33. A polyethylene composition comprising one or more ethylene polymers and one or more functionalized polymers produced by the process of claim 1.

* * * * *